US008751218B2

(12) United States Patent
Dang et al.

(10) Patent No.: US 8,751,218 B2
(45) Date of Patent: Jun. 10, 2014

(54) INDEXING CONTENT AT SEMANTIC LEVEL

(75) Inventors: Jiangbo Dang, Plainsboro, NJ (US);
Murat Kalender, Istanbul (TR);
Candemir Toklu, Princeton, NJ (US);
Kenneth Hampel, Yardley, PA (US)

(73) Assignee: Siemens Aktiengesellschaft, München (DE)

( * ) Notice: Subject to any disclaimer, the term of this patent is extended or adjusted under 35 U.S.C. 154(b) by 609 days.

(21) Appl. No.: 13/018,462

(22) Filed: Feb. 1, 2011

(65) Prior Publication Data
US 2011/0196670 A1    Aug. 11, 2011

Related U.S. Application Data

(60) Provisional application No. 61/302,680, filed on Feb. 9, 2010.

(51) Int. Cl.
*G06F 17/27*  (2006.01)
*G06N 5/02*  (2006.01)
(52) U.S. Cl.
USPC ................................................ 704/9; 706/55
(58) Field of Classification Search
CPC .............................. G06F 17/2785; G06F 17/27
USPC ..................... 704/9; 706/45, 46, 55
See application file for complete search history.

(56) References Cited

U.S. PATENT DOCUMENTS

| 7,558,778 | B2 * | 7/2009 | Carus et al. | 1/1 |
| 7,925,610 | B2 * | 4/2011 | Elbaz et al. | 706/55 |
| 8,265,925 | B2 * | 9/2012 | Aarskog | 704/9 |
| 8,380,511 | B2 * | 2/2013 | Cave et al. | 704/270 |
| 2004/0029085 | A1 * | 2/2004 | Hu et al. | 434/178 |
| 2007/0185831 | A1 * | 8/2007 | Churcher | 707/3 |
| 2009/0083027 | A1 * | 3/2009 | Hollingsworth | 704/9 |
| 2011/0119047 | A1 * | 5/2011 | Ylonen | 704/9 |

OTHER PUBLICATIONS

Galley et al., "Improving Word Sense Disambiguation in Lexical Chaining", In Proceedings of IJCAI, 2003.*
Liu et al., "Word Sense Disambiguation in Queries", In Proceedings of the 14$^{th}$ ACM International Conference on Information and Knowledge Management, 2005.*

* cited by examiner

*Primary Examiner* — Samuel G Neway
(74) *Attorney, Agent, or Firm* — Michele L. Conover

(57) ABSTRACT

Systems and methods are disclosed that perform automated semantic tagging. Automated semantic tagging produces semantically linked tags for a given text content. Embodiments provide ontology mapping algorithms and concept weighting algorithms that create accurate semantic tags that can be used to improve enterprise content management, and search for better knowledge management and collaboration.

23 Claims, 14 Drawing Sheets

| | | | |
|---|---|---|---|
| CC | Coordinating conjunction | RP | Particle |
| CD | Cardinal number | SYM | Symbol |
| DT | Determiner | TO | to |
| EX | Existential there | UH | Interjection |
| FW | Foreign word | VB | Verb, base form |
| IN | Preposition | VBD | Verb, past tense |
| JJ | Adjective | VBG | Verb, gerund/present participle |
| JJR | Adjective, comparative | VBN | Verb, past participle |
| JJS | Adjective, superlative | VBP | Verb, non-3rd ps. sing. present |
| LS | List item marker | VBZ | Verb, 3rd ps. sing. present |
| MD | Modal | WDT | wh-determiner |
| NN | Noun, singular or mass | WP | wh-pronoun |
| NNP | Proper noun, singular | WP$ | Possessive wh-pronoun |
| NNPS | Proper noun, plural | WRB | wh-adverb |
| NNS | Noun, plural | `` | Left open double quote |
| PDT | Predeterminer | , | Comma |
| POS | Possessive ending | '' | Right close double quote |
| PRP | Personal pronoun | . | Sentence-final punctuation |
| PRP$ | Possessive pronoun | : | Colon, semi-colon |
| RB | Adverb | $ | Dollar sign |
| RBR | Adverb, comparative | # | Pound sign |
| RBS | Adverb, superlative | -LRB- | Left parenthesis * |
| | | -RRB- | Right parenthesis * |

FIG. 9

| Algorithm (%) | CATEGORY | DOMAIN | HYPERNYM | HOLONYM | SUM | RANK | SUM+ |
|---|---|---|---|---|---|---|---|
| Precision | 43.7385 | 40.2737 | 54.2291 | 76.9535 | 55.9438 | 79.7646 | 79.5692 |
| Recall | 28.0987 | 25.7063 | 51.1087 | 30.8355 | 53.6455 | 79.7646 | 79.5692 |
| F-measure | 34.2161 | 31.3819 | 52.6227 | 44.0287 | 54.7706 | 79.7646 | 79.5692 |

FIG. 10

INDEXING CONTENT AT SEMANTIC LEVEL

CROSS REFERENCE TO RELATED APPLICATIONS

This application claims the benefit of U.S. Provisional Application No. 61/302,680, filed on Feb. 9, 2010, the disclosure which is incorporated herein by reference in its entirety.

BACKGROUND OF THE INVENTION

The invention relates generally to computational semantic analysis. More specifically, the invention relates to a method and system that automatically maps text content to entities defined in an ontology.

It has become increasingly difficult to locate desired information from the Internet or content management systems. With an ever increasing amount of content, search engines are heavily relied on to search for information and documents. However, existing search tools are experiencing difficulties. Keyword based searches often return results with low precision and recall.

With the emergence of Social Web, user-generated tags can be used by search engines or users to improve search results. Tagging helps users to describe, find and organize content. Well defined tags give brief information about the content of tagged documents. Therefore, tags provide a practical way to determine whether a document is of interest without reading it. Users or search engines can use tags to mitigate the issues of low precision and recall.

Content tagging or collective tagging can improve search results by allowing search engines to exploit tags from the wisdom of crowds. However, the improvement is limited because tags are: (1) free from context and form, (2) user generated, (3) used for purposes other than description, and (4) often ambiguous. Since tagging is a voluntary action, some documents are not tagged at all. Furthermore, interpretation of the tags associated with tagged documents also remains a challenge.

To facilitate better content management and search, current content tagging systems need improvement. Current tags usually fail to capture exact meanings and contexts of keywords because of polysemy. Human language is ambiguous. Words may have different meanings according to the context in which they are used. Moreover, content taggers may use noisy and misleading tags such as subjective (e.g., cool, nice), misspelled and unrelated tags with content. In addition, tagging requires extra effort that makes the process expensive and time consuming. Therefore, most content authors generally do not assign metadata to their documents. It is estimated that 80% of business documents are maintained in an unstructured format.

The above limitations motivated research into automated semantic tagging systems. Automatic tagging systems can analyze given documents and offer significant terms as tags without user intervention. Automatic tagging offers advantages such as accuracy, consistency, standardization, convenience and decreased cost. Unless tags are represented in a computer understandable and processable way, automatic tagging systems return errors.

Ontologies are a key enabling technology for the Semantic Web. The assignment of ontological entities (terms interlinked by links of relationships between terms) to a content is called Semantic Tagging or Semantic Annotation. Semantic tags give content well-defined meaning, and can automate content tagging and search with more accurate and meaningful results. Semantic tagging advances automatic tagging by providing more meaningful tags of ontological entities instead of context-less keywords and making content and tags computer understandable.

As a formal declarative knowledge representation model, ontology provides a foundation upon which machine understandable knowledge can be obtained and tagged, and as a result, it makes semantic tagging and search possible. Performance of a semantic tagging and search application is highly dependent on its ontology. A term within content can be semantically tagged and retrieved, if it is properly defined in the ontology. Common ontological knowledge bases such as WordNet and Wikipedia can be used for this purpose, but they have limitations.

UNIpedia, developed by Siemens Corporate Research, serves as a high quality, comprehensive, up-to-date, domain independent resource for semantic applications. UNIpedia uses WordNet as its backbone ontology, and maps instances from other knowledge bases to WordNet concepts by introducing an isA relationship between them. By combining WordNet, Wikipedia and OpenCyc, the current version of UNIpedia consists of 2,242,446 terms, 74,390 concepts and 1,491,902 instances.

There are three classes of semantic tagging systems: (1) manual, (2) semi-automatic, and (3) automatic.

In manual tagging systems, users tag documents with a controlled vocabulary defined in an ontology. Manual tagging is a time consuming process which requires deep domain knowledge and expertise, but also introduces inconsistencies by human annotators. SemaLink is a manual semantic tagging system.

Semi-automatic systems analyze documents and offer ontological terms from which annotators may choose. Semi-automatic systems may use humans to disambiguate terms. Faviki is a semi-automatic tagging system that brings together social bookmarking and Wikipedia. It offers DBpedia entities to users to tag web pages with.

Automated semantic tagging systems analyze documents and automatically tag them with ontological concepts and instances. Zemanta is an automatic semantic tagging system that suggests content from various sources such as Wikipedia, YouTube, Flickr and Facebook. Zemanta disambiguates terms and maps them to a Common Tag ontology.

SemTag is another automatic tagging system. SemTag uses Taxonomy-Based Disambiguation (TBD) to disambiguate terms and maps documents to entities defined in an experimental knowledge base. The knowledge base is not a comprehensive knowledge base and consists of only 72,000 concepts.

Automatically mapping a polysemous word to an appropriate sense (meaning) according to its context, is called Word Sense Disambiguation (WSD). WSD is a challenge in semantic tagging. There are three main approaches to WSD: (1) supervised, (2) unsupervised, and (3) knowledge-based.

Supervised approaches use sense annotated data sets as a training data for learning disambiguation patterns. Support Vector Machines (SVMs), Decision Trees and Neural Networks are widely used supervised WSD algorithms. In contrast, unsupervised systems use a raw corpus as training data to learn disambiguation patterns. Word Clustering and Co-occurrence Graphs are examples of unsupervised techniques. Both approaches require training data and are computationally expensive.

Knowledge-based approaches use structured resources such as Machine Readable Dictionaries (MRDs) and ontologies. These methods are preferred because of their wider coverage despite their lower performance in comparison to machine learning approaches. There are three knowledge based techniques in WSD: (1) sense definitions, (2) selectional restrictions, and (3) structural approaches.

Sense definitions disambiguate senses by comparing and counting the number of overlapping words between sense descriptions. Sense definitions are very sensitive to the words used in sense descriptions and perform poorly when compared to other knowledge-based algorithms.

Selectional restrictions disambiguate senses by restricting possible meanings of senses according to their surrounding words. Selectional restrictions also exhibit low performance.

Structural approaches disambiguate senses based on the semantic interrelationships of concepts. In a local context, semantic similarities between pairs of words are calculated according to similarity measures. The performance of structural approaches is dependent on the richness of a knowledge base in terms of the defined semantic interrelationships. Its performance is higher compared to knowledge-based approaches, but lower compared to supervised methods.

The limitations discussed above provide the motivation for an improved automated semantic tagging method and system.

SUMMARY OF THE INVENTION

The inventors have discovered that it would be desirable to have methods and systems that perform automated semantic tagging. Automated semantic tagging produces semantically linked tags for a given text content. Embodiments provide ontology mapping algorithms and concept weighting algorithms that create accurate semantic tags that can be used to improve enterprise content management, and search for better knowledge management and collaboration. Embodiments map text content to entities defined in an ontology such as UNIpedia, developed by the Siemens Knowledge Management Team. UNIpedia is a universal domain-independent ontology that unifies different ontological knowledge bases by reconciling their instances as WordNet concepts. For domain-dependent applications, embodiments can use the same approach to map text content to entities defined in domain-specific ontologies.

Embodiments include ontology mapping and a linear time O(n) lexical chaining Word Sense Disambiguation (WSD) algorithm to perform the mapping process. A lexical chaining algorithm disambiguates terms based on several ontological features (properties). The lexical chaining algorithm provides: (1) a computation efficient approach to mapping concepts in real-time, (2) information for weighting concepts and finding significant ones, and (3) extracting semantics without depending on any prior knowledge.

A comparative evaluation of the ontological and statistical features for the WSD task is presented with use of a graphical framework. The performances of four ontological properties and a statistical property are evaluated on the SemCor and Senseval sense annotated datasets. Statistical and ontological features are used for weighting the semantic tags, which are recommended to content authors.

Embodiments also employ a Graphical User Interface (GUI) to visualize the results. With this interface, users can modify input parameters and view the generated output in two dimensional and three dimensional semantically connected graphs.

In contrast to existing semantic tagging systems, embodiments (1) use UNIpedia as a knowledge base to cover most named entities, (2) disambiguate terms using an improved linear time lexical chaining algorithm by summarizing weighted WSD scores from different lexical chains, and (3) weight tag significance within a document using both ontological and statistical features.

One aspect of the invention provides a semantic tagging method that outputs semantically linked tags for text content. Methods according to this aspect include inputting the text content, extracting nouns and noun phrases from the text content, mapping the extracted nouns and noun phrases to terms of an ontology, mapping the extracted nouns and noun phrases to a correct sense of the ontology terms using lexical chaining Word Sense Disambiguation (WSD) algorithms, weighting the significance of the extracted nouns' and noun phrases' concepts from their ontological and statistical features, extracting key-phrases from the weighted concepts, and outputting the key-phrases as semantic tags.

Another aspect of the invention is wherein extracting nouns and noun phrases from the text content further comprises detecting sentences from the text content, detecting tokens (words) from the detected sentences, labeling the tokens, and extracting consecutive noun tokens and noting their frequency of use.

Another aspect of the invention is wherein mapping the extracted nouns and noun phrases to terms of an ontology further comprises accessing the ontology, comparing the nouns and noun phrases with the ontology terms, and if there is an exact match, retrieving the ontology term, and if there is not an exact match, performing phrase mapping using a rule-based algorithm.

Another aspect of the invention is wherein mapping the extracted nouns and noun phrases to a correct sense of the ontology terms further comprises creating a hypernym lexical chain with WSD scores for senses of the input nouns and noun phrases, creating a domain lexical chain with WSD scores for senses of the input nouns and noun phrases, creating a holonym lexical chain with WSD scores for senses of the input nouns and noun phrases, creating a category lexical chain with WSD scores for senses of the input nouns and noun phrases, normalizing the WSD scores in each of the hypernym, domain, category and holonym lexical chains, generating a WSD score using a sense rank algorithm, assigning weights to each algorithm and summing the weighted WSD scores for the hypernym, domain, category, holonym lexical chains, and the sense rank algorithm, evaluating the hypernym, domain, category and holonym lexical chains, the sense rank algorithm and optimizing their weights for a given target data, and mapping the nouns and noun phrases to a highest ranked sense.

Another aspect of the invention is wherein weighting the significance of the hypernym, domain, category and holonym lexical chains further comprises computing semantic Term Significance (TS) scores using lexical chaining WSD scores derived from previous phrase, Depth and Information Content (IC) values, computing statistical TS scores using Term Frequency (TF) and Inverse Google Popularity (IGP), computing concept TS scores by summing the semantic and statistical scores, sorting concepts by their concept TS scores in descending order and extracting top key-phrases, diversifying key-phrase distribution over different categories using heuristics, and clustering key-phrases according to categories such as people, event, location, time, etc. to describe the text content.

Another aspect of the invention is wherein extracting key-phrases from the weighted concepts further comprises filtering all key-phrases (redundant senses) except the top ranked key-phrase of a sense, and filtering key-phrases that have a lower frequency than all occurrences of its children concepts.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 9 is an exemplary table of part-of-speech tags defined in the Penn Treebank tagset.
FIG. 10 is an exemplary table comparing Precision, Recall and F-measure values for the sense mapping algorithms over the SemCor data set.

DETAILED DESCRIPTION

Figure 1:
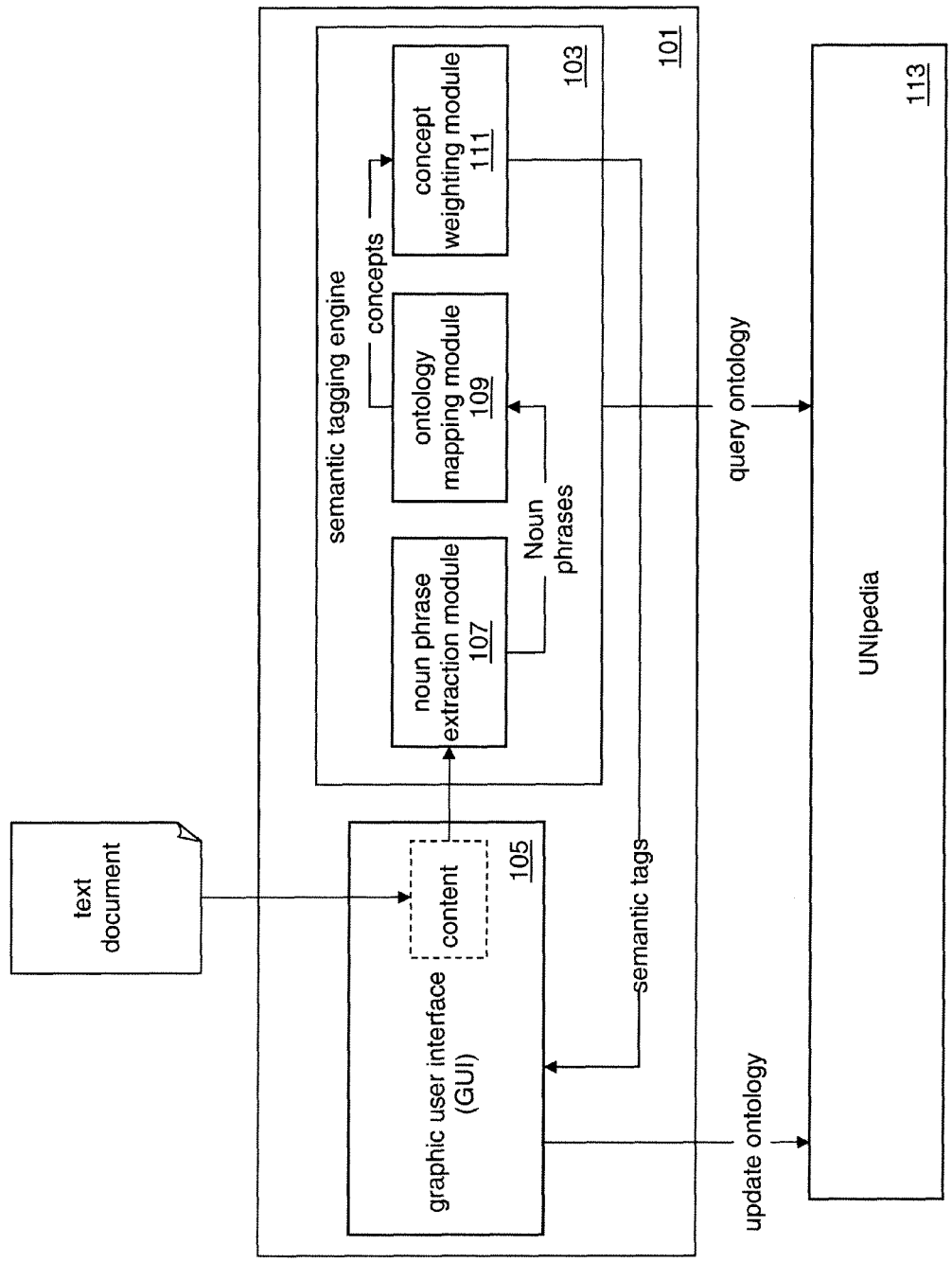
FIG. 1 is an exemplary system architecture.

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting, and coupling. Further, "connected" and "coupled" are not restricted to physical or mechanical connections or couplings.

It should be noted that the invention is not limited to any particular software language described or that is implied in the figures. One of ordinary skill in the art will understand that a variety of software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Embodiments of the invention provide methods, system frameworks, and a computer-usable medium storing computer-readable instructions that perform automated semantic tagging that maps text content to entities defined in an ontology. Embodiments use a linear time O(n) lexical chaining WSD algorithm for the mapping process. The lexical chaining algorithm disambiguates terms based on several ontological features. After the mapping process, significance of semantic tags within the content is calculated using statistical and ontological features. Embodiments may be deployed as software as an application program tangibly embodied on a program storage device. The application code for execution can reside on a plurality of different types of computer-readable media known to those skilled in the art.

By adopting UNIpedia or other ontologies as the tagging ontology, embodiments produce semantically linked tags for a given text content. These semantic tags can be used to improve enterprise content management and search for better knowledge management and collaboration. As a domain-independent ontology, UNIpedia is used for general content tagging purposes. For domain-specific content and applications, embodiments can also be used to map text content to entities defined in domain-specific ontologies.

Figure 2:
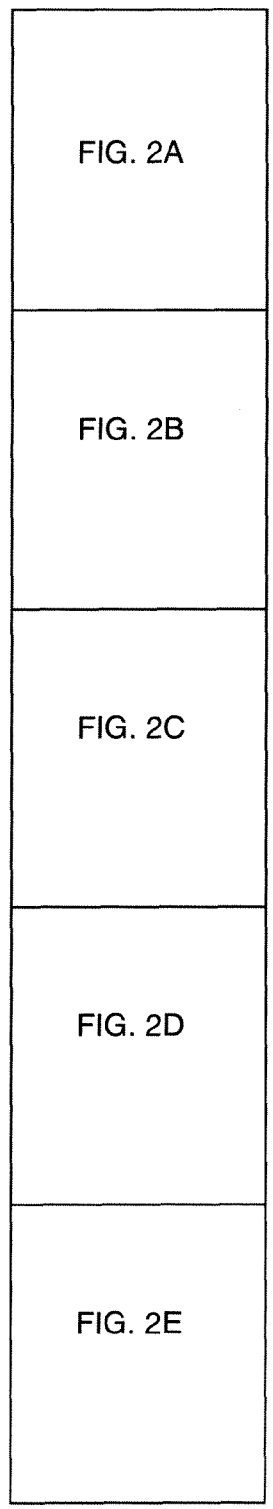
FIG. 2 and FIGS. 2A-2E illustrate an exemplary automated semantic tagging method.
Figure 2A:
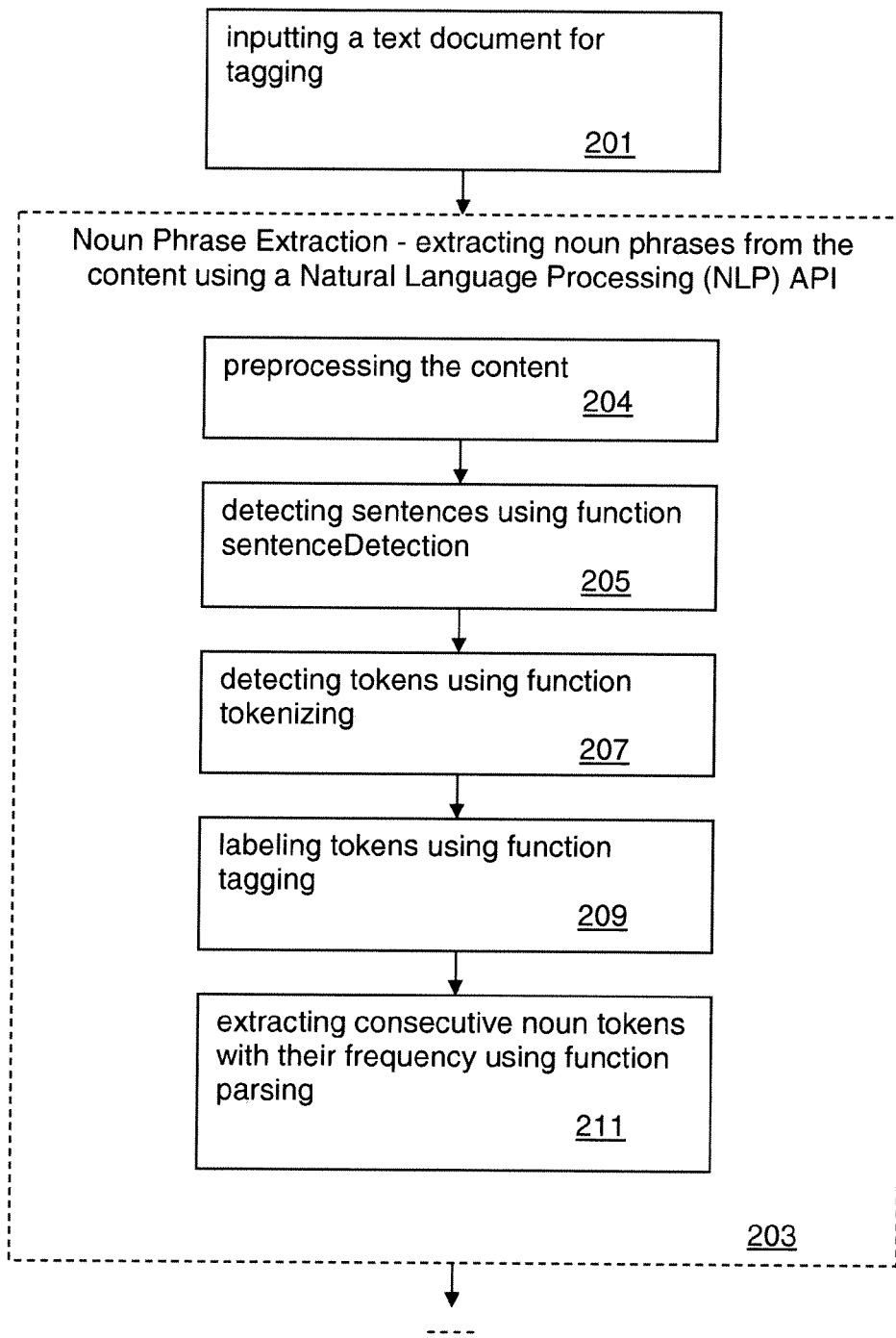
Figure 2B:
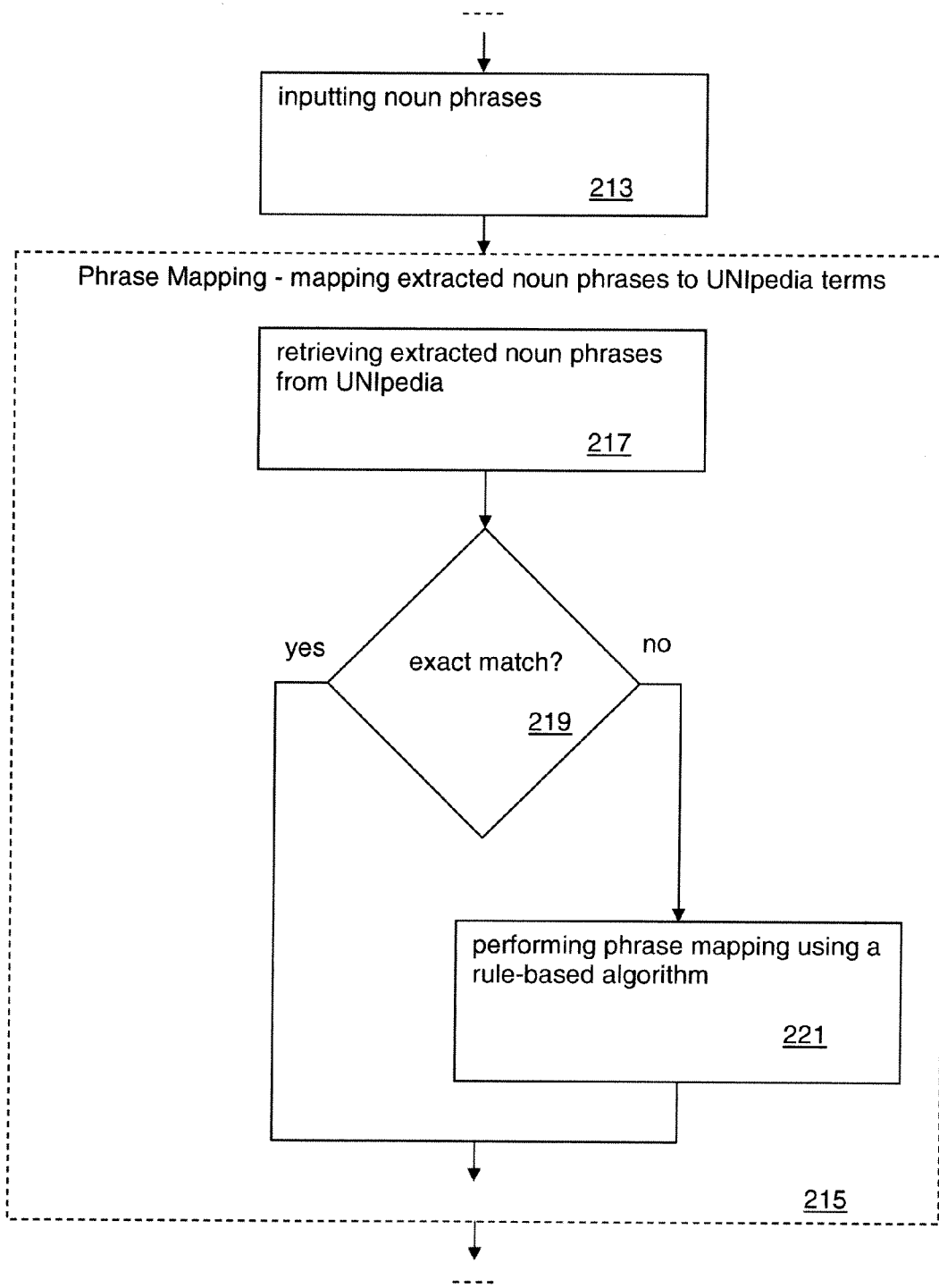
Figure 2C:
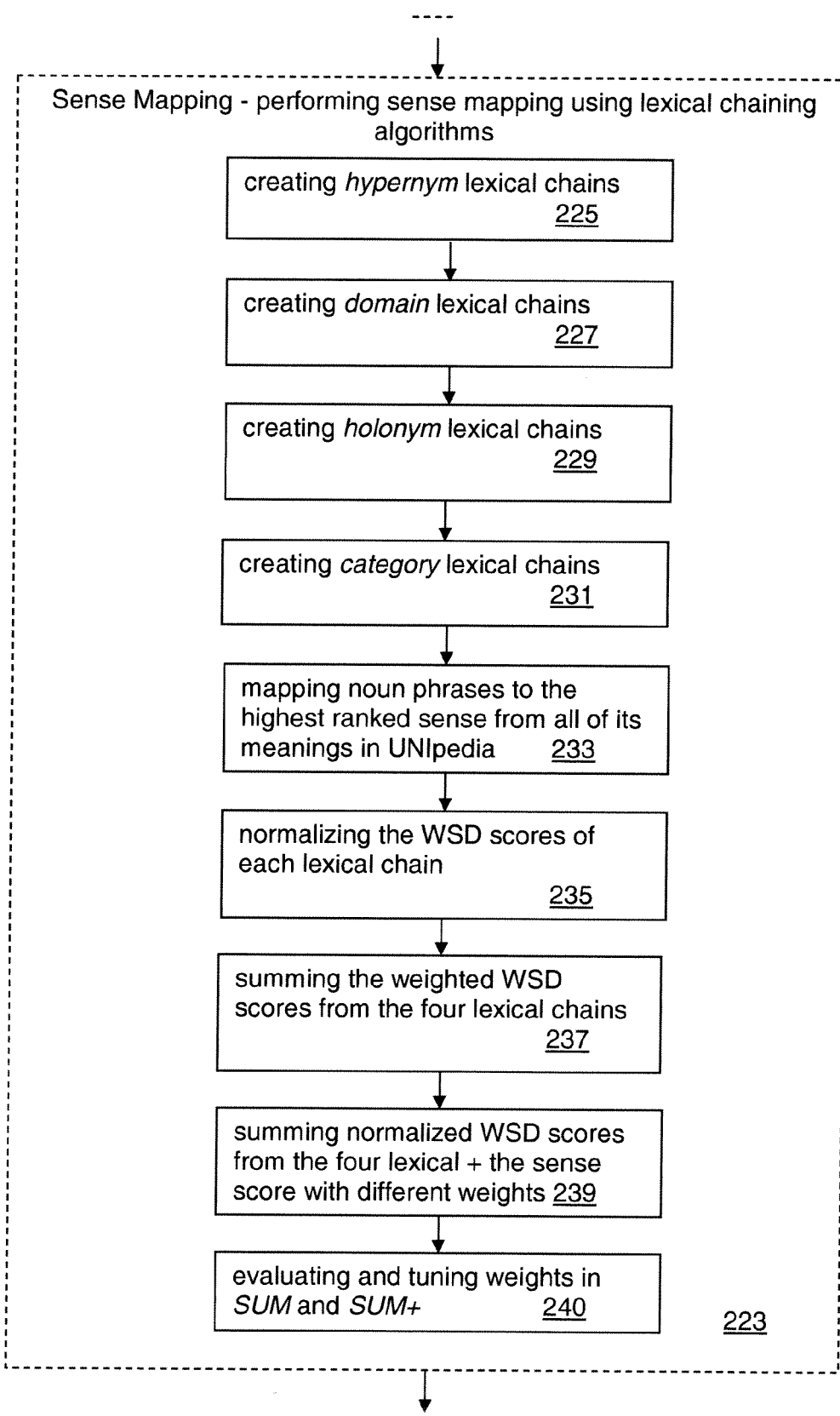
Figure 2D:
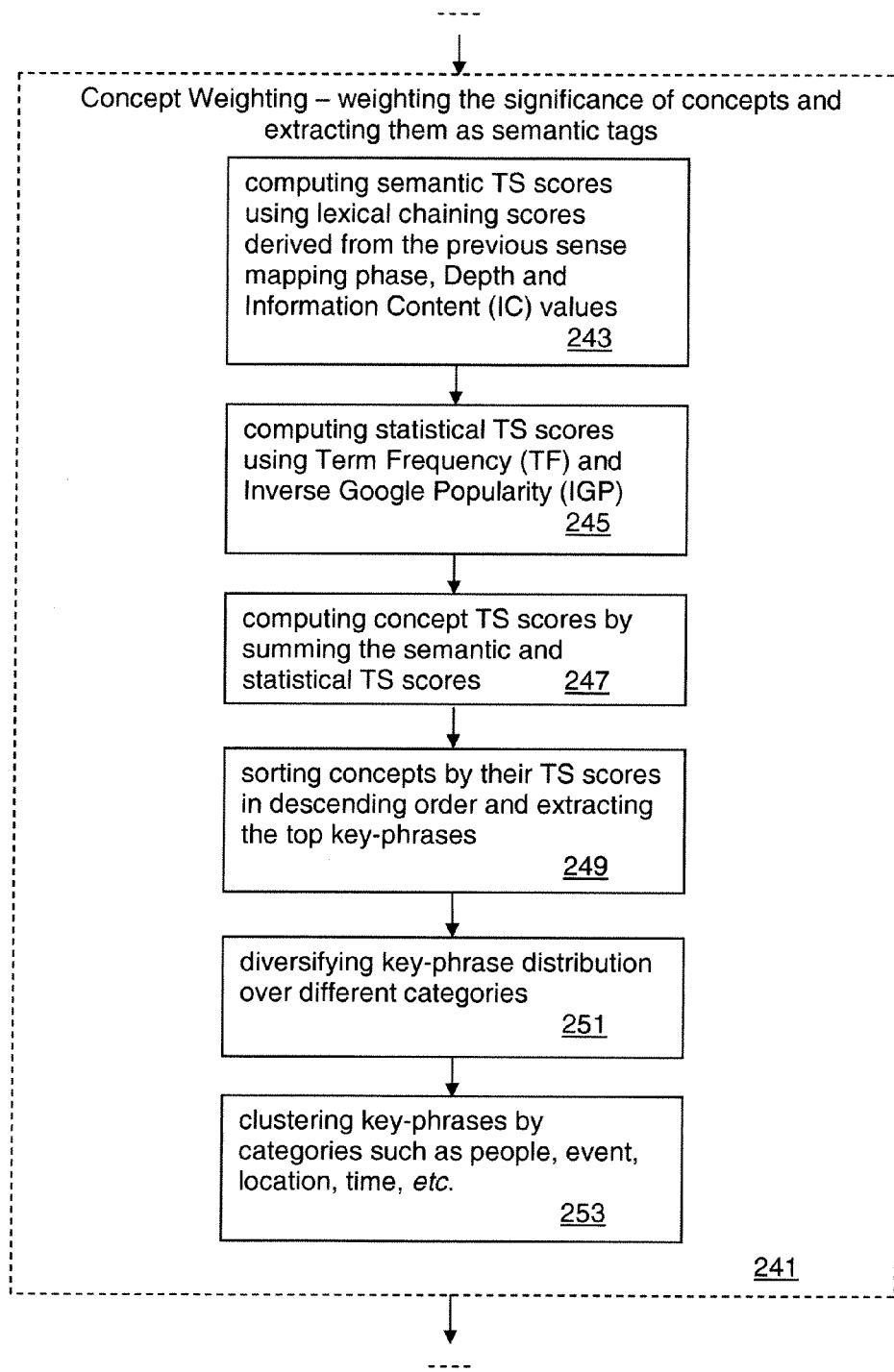
Figure 2E:
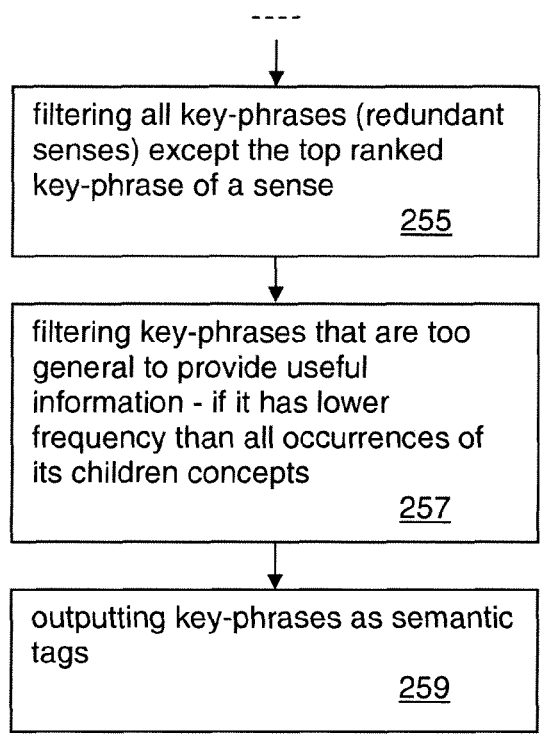

FIG. 1 shows a system architecture 101 and FIG. 2 shows a method. The system architecture 101 comprises a semantic tagging engine 103 and a Graphic User Interface (GUI) 105. The semantic tagging engine 103 analyzes a given text content and assigns ontological entities and weights them using semantic and statistical features. The GUI 105 allows for user configuration and testing. With it users can tune the tagging engine 103 algorithm parameters and visualize weighted semantic tags in semantically connected graphs.

The tagging engine 103 comprises three modules, a noun phrase extraction module 107, an ontology mapping module 109 and a concept weighting module 111. The tagging engine 103 can receive textual content as input (step 201). The input can vary from one paragraph of content to text documents in a file system. The noun phrase extraction module 107 parses the raw text input and passes noun phrases to the ontology mapping module 109. The ontology mapping module 109 maps the noun phrases to an ontology, such as UNIpedia 113. It performs two functions: (1) phrase mapping and (2) sense mapping. The concept weighting module 111 weights semantic concepts output from the ontology mapping module 109 using statistical and ontological features.

Nouns usually best describe what content users are interested in, such as books, musicians, movies, actors, etc. For tagging, nouns are used to describe content and its context. Noun extraction is an important step of semantic tagging since it affects tagging quality. The noun phrase extraction module 107 uses Natural Language Processing (NLP) Application Programming Interfaces (APIs) that include OpenNLP API and MINIPAR (step 203). OpenNLP is an organization for open source NLP projects and provides open source NLP methods. MINIPAR is a broad-coverage parser for the English language. Algorithms use some basic NLP functions from them. OpenNLP API and MINIPAR provide equal functionality in this case. Embodiments use both NLP APIs. Users can switch between them using the GUI 105. The pseudocode of the noun phrase extraction module 107 is

```
C is the content of a given document
P is an empty list
L is an empty list
S is an empty list
W is an empty list
T is an empty list
length (i)return s length a given list i
append (i, j)appends the phrase i to the list j
clear (i)removes all elements of a given list i
C ← preProcess (C)
S ← sentenceDe tection (C
for i = 0 to length (S)do
    W ← tokenizing (S_i)
    T ← tagging (W)
    for j = 0 to length (W)do
        if T_j ="Noun" or W_j − 1 ="The" then
            append (W_j,L)
        else
            append (L,P)
```

```
        clear (L)                           (1)
      end if
    end for
  end for
  Return P
``` where the preProcess function (step 204) removes all characters other than alphabetical and grammatical punctuation marks. Punctuation marks are used for sentence identification. Numerical expressions (i.e., money, percentage and years) are filtered after the preProcess function.

Sentence detection, tokenizing and tagging are functions provided by NLP APIs.

The sentenceDetection function (step 205) splits given content into sentences.

The tokenizing function further splits the detected sentence into tokens (words) (step 207). Tokenizing can not be handled by detection of the space character. A tokenizer is required to split words that are contractions (e.g., doesn't).

The tagging function labels the extracted tokens with a part-of-speech such as noun, verb, adverb, etc. (step 209). The types of tags are listed in FIG. 9. Noun phrases are consecutive noun tokens tagged as NN, NNP, and NNPS. They are extracted with their occurrence frequency (step 211). Some noun phrases comprise a definite article plus a noun (e.g., the White House).

The parsing function is presented as the inner for-loop in (1). The parsing function finds some noun phrases, instead of all kinds of noun phrases by adopting the chunking function from NLP APIs. The chunking function assigns part-of-speech tags to the extracted tokens.

FIG. 9 shows a list of possible part-of-speech tags and their description. Not all kinds of noun phrases are suitable for content tagging. Human or content tagging systems tend to use named entities for content tagging purposes. Therefore, the noun phrase extraction module 107 extracts entities or named entities. For example, given a sentence, OpenNLP identifies "a rare black squirrel, a regular visitor and a suburban garden" as noun phrases. These noun phrases are not suitable as entities from an ontology. In contrast, squirrel, visitor and garden would be extracted as noun phrases using (1).

During noun phrase extraction, noun phrases are extracted from the content. The ontology mapping module 109 maps these noun phrases to UNIpedia terms—concepts or their instances (steps 215, 223). The mapping process is performed via two steps: (1) phrase mapping and (2) sense mapping.

Noun phrases are mapped to UNIpedia to retrieve their corresponding UNIpedia terms. As described below in (2), if there is an exact match between the noun phrase and a UNIpedia term, the term is returned as the result (steps 213, 217, 219). Otherwise if the noun phrase is composed of multiple tokens of words, a rule-based algorithm is used for phrase mapping (steps 219, 221). Two sub-phrases are generated by removing the first and last word from the noun phrase. These two noun phrases replace the original noun phrase and repeat the phrase mapping process until there is a match or there are no more tokens left. The key-phrase extraction algorithm favors the longer and the right side phrase in case there is a tie. Consider the noun phrase "semantic web tool." It is not defined in UNIpedia, thus it is divided into two sub-phrases which are "web tool" (right side) and "semantic web" (left side). "Semantic Web" is defined unlike "web tool." Therefore, the phrase mapping algorithm maps "semantic web tool" to "semantic web."

The pseudocode of key-phrase extraction (step 215) is

```
P is an input noun phrase
length (i)returns length a token number of a given phrase i
qu(i)returns the number of concept that matches i in UNIpedia
rmftkn (i)removes the first token of input phrase i
rmltkn (i)removes the last token of input phrase i
phraseMapping(P)
begin
  if qu(P) > 0 then
    Return P
  else if length (P) = 1 then
    Return NULL
  else
    P_r ← phraseMapping(rmftkn (P))
    P_l ← phraseMapping(rmltkn (P))
    if length (P_r) ≥ length (P_l)then
      Return P_r
    else
      Return P_l                           (2)
    end if
  end if
end
```

Plurality is another problem when mapping to the ontology. In certain cases, plurality causes mapping problems. For example, "Siemens" is a company and would be stemmed to "Siemen" which would be a wrong conversion. Therefore, (2) queries both the stemmed and the original forms of noun phrases. If both are defined, the original form of the noun phrase is chosen.

Word Sense Disambiguation (WSD) is an open problem of natural language processing, which comprises the method of identifying which sense of a word (i.e., meaning) is used in any given sentence when the word has a number of distinct senses (polysemy). In UNIpedia, terms may have several senses, each of which is a UNIpedia concept. These polysemous terms receive different means according to their context. As the outcome from the previous step, noun phrases can not be mapped to UNIpedia terms directly if these terms are polysemous. Instead, WSD algorithms map them to the correct UNIpedia senses.

Embodiments use developed lexical chaining algorithms with different ontology features to overcome the disambiguation problem. The algorithms used in embodiments improve mapping accuracy.

Semantically related words are connected to each other and form a set of lexical chains which show cohesions through the content. A linear time O(n) lexical chaining algorithm that adopts the assumption of one sense per discourse is used for the WSD task. One sense per discourse assumes that a word generally retains its meaning across all its occurrences in a given discourse. For mapping to the appropriate meaning, the ontology mapping module 109 examines the context of documents by forming lexical chains.

In the ontology mapping module 109 (step 223), the ontological properties hypernym, domain, category and holonym are used to create lexical chains. For each feature, a lexical chaining algorithm is applied separately to create four different sets of chains. Therefore, each feature's contribution to the WSD can be observed, and further explorations and improvements may be performed.

The hypernymy relation forms the taxonomy of an ontology. It defines an isA relationship between concepts. For example, the concept person is a hypernym (or parent) of the concept scientist.

The hypernym mapping algorithm (step 225) runs in linear time O(n). Given a set of senses, each sense is connected to its parent sense. In this way, senses are not compared with each other and are instead connected to each other with common ancestors to form lexical chains. When one sense is connected, it increases WSD scores of its ancestor senses until reaching a predetermined threshold of ancestor distance. Then each sense is assigned a WSD score by summation of its ancestor senses' WSD scores. The pseudocode of the hypernym mapping algorithm is

```
P is a listof extracted noun phrases
C is an empty list
Threshold is a constant v ariable
selectedCo ncepts is an empty list
scores (c) is an empty hashtable keeps scores of concepts where key c
is a concept id phraseConc eptScore (c,p) is a n empty hashtable keeps
scores added by all concepts of a phrase where key is an combinatio n
of concept id c and noun phrase p
length (i)returns length of a given list i
concepts (p)returns a list of concep ts that co rresponds to a given phrase p
parent (c,n)return s the n th parent for a given concept c
for i = 0 to length (P)do
  C ← concepts (P_i)
    for j = 0 to length (C)do
      for k = 0 to Threshold do
        c ← parent (C_j,k)
        scores (c) ← scores (c) + (1 /(k + 1))
        phraseConc eptScores (c + P_i) ← phraseConc eptScores
          (c,P_i) + (1 /(k + 1))
      end for
    end for
end for
// Secondphas estarts
for i = 0 to length (P)do
  C ← concepts (P_i)
    for j = 0 to length (C)do
      for k = 1 to Threshold do
        c ← parent (C_j,k)
        scores (C_j) ← scores (C_j) + scores (c) − phraseConc eptScores
          (c,P_i)
      end for
    end for
end for
// finding max scoredconc ept
for i = 0 to length (P)do
  C ← concepts (P_i)
  S_max ← scores (C_0)
  selectedCo ncepts_i ← C_0
    for j = 1 to length (C)do
      if scores (C_j) > S_max
        S_max ← scores (C_j)
        selectedCo ncepts_i ← C_j
      end if
    end for
Return selectedCo ncepts
```

(3)

The hypernym mapping algorithm (3) receives a set of noun phrases and corresponding senses as an input, and creates lexical chains using an ontology such as UNIpedia. The algorithm has two phases. First, each sense has an initial WSD score of zero. Once it is connected, it increases WSD scores of their ancestor senses until reaching a predetermined threshold of ancestor distance. Senses also increase their WSD scores to contribute to WSD scores of their child senses.

In the second phase, senses increment their WSD scores by adding WSD scores of their ancestor senses. In this way, senses that have more common ancestors with other senses receive higher WSD scores.

Finally, senses which receive the highest WSD scores among the phrases' senses are selected for the extracted noun phrases.

Considering cases in which senses derived from the same phrase have different parent senses, and these parent senses may have a common ancestor. These scenarios create lexical chains composed of senses derived from the same phrase, although they are not supposed to appear in the same lexical chain. To solve this issue, WSD scores added by a sense itself and senses that have common sense names are subtracted. In addition, one sense can be derived from multiple phrases. In these cases, a sense earns an extra WSD score of the number of its synonyms. The sense scoring formula is defined as $$S(c) = \sum_{n=1}^{N} \frac{1}{distance(c, child_{n_c})}, \text{ and} \quad (4)$$

$$hypernym(c) = \sum_{n=1}^{M} s_n - s_{n_c} + synonym(c), \quad (5)$$

where the S(c) function calculates the score of a given concept c, N is the number of child senses that pass through the context of concept c, hypernym(c) is the hypernym WSD score for a given concept c, $s_n$ is the hypernym WSD score of the $n^{th}$ ancestor of a concept, $s_{n_c}$ is the score added by a concept and concepts sharing the same name to the $n^{th}$ ancestor, M equals the maximum ancestor distance constant and synonym(c) returns the number of synonyms of a concept.

Senses that have a higher number of connected senses in the lexical chains, receive a higher WSD score and these senses form the context. Therefore, the hypernym algorithm maps a phrase to a sense, which receives a higher WSD score than the phrase's other senses.

Figure 3:
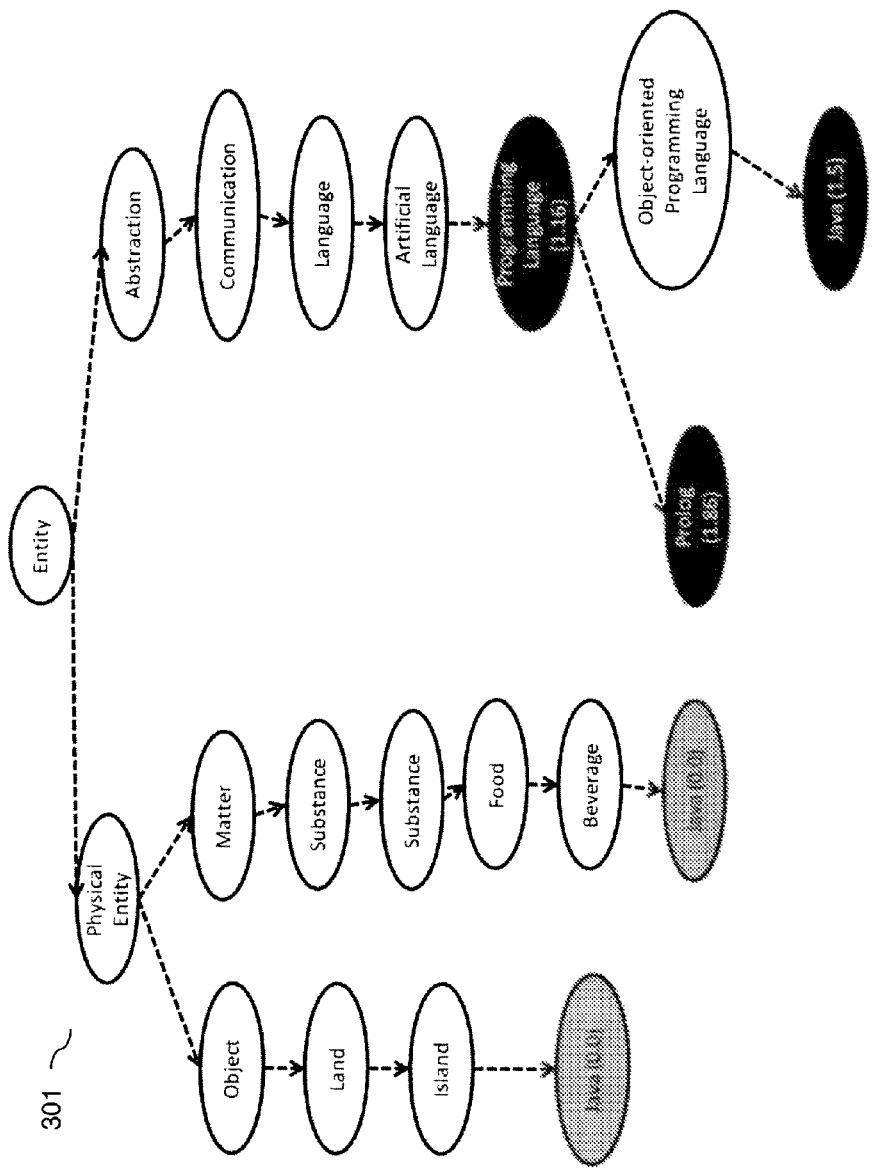
FIG. 3 is an exemplary hypernym based lexical chain.

FIG. 3 shows a hypernym based lexical chain 301 created by the hypernym mapping algorithm (3) with Programming Language, Java and Prolog as noun input phrases. The meanings of the noun phrases are defined below. The superscript and subscript denote the word's sense rank and part-of-speech tag, respectively. In FIG. 3, the solid (black) nodes represent selected senses by the lexical chaining algorithm. Grey nodes are senses will be ignored after the WSD step. The open (white) nodes represent ancestors of senses. Parenthetical numbers represent the calculated WSD scores of senses.

$$Programming Language = \{prog.lang._n^1(a \text{ language } ...)\}, \quad (6)$$

$$Java = \begin{cases} Java_n^1(\text{an island in Indonesia } ...) \\ Java_n^2(\text{a beverage } ...) \\ Java_n^3(\text{a programming language } ...) \end{cases}, \text{ and} \quad (7)$$

$$Prolog = \{Prolog_n^1(a \text{ computer language})\}. \quad (8)$$

The hypernym mapping algorithm (3) maps Java to its third, and Programming Language and Prolog to their first meanings. Because, these meanings have a common ancestor of Programming Language within a defined maximum ancestor distance. Other meanings do not have common or closer ancestors. The hypernym mapping algorithm (3) gives higher WSD scores to specific senses (defined in higher depths) and senses that have closer ancestor senses within a given content. Therefore, Prolog receives the highest WSD score for the given input phrases.

The domain (topic) is another semantic relation that groups concepts to different topics.

The domain mapping algorithm (step 227) creates lexical chains using the domain property of senses. Senses within the same domain are connected via the domain node. They are not directly connected to each other. Given a set of noun phrases and their senses, they will form several lexical chains. Each chain has a domain node and several sense nodes. Within a chain, the score of each node including the domain node is equal to the size of the chain—how many nodes in the chain except the domain node. Then, the domain algorithm maps a noun phrase to a sense that receives the highest WSD score among all senses of the noun phrase. The pseudocode of the domain mapping algorithm is

```
P is a list of extracted noun phrases
selectedConcepts is an empty list
C is an empty list
H is an empty list
scores(c) is an empty hashtable that keeps scores of concepts where key
  is c is a concept id length(i)returns length of a given list i
concepts(p)returns a list of concepts that correspond s to a given phrase p
domain(c)returns a list of domain concepts for a given concept c
for i = 0 to length(P)do
  C ← concepts(P_i)
    for j = 0 to length(C)do
      H ← domain(C_j)
      for k = 0 to length(H)do
        scores(H_k) = 1 + scores(H_k)
      end for
    end for
end for
// finding max scoredconcept
for i = 0 to length(P)do
  C ← concepts(P_i)
  S_max ← 0
    for j = 0 to length(C)do
      H ← domain(C_j)
      for k = 0 to length(H)do
        scores(C_j) = scores(H_k)
      end for
      if scores(C_j) > S_max
        S_max ← scores(C_j)
        selectedConcepts_i ← C_j
      end if
    end for
end for                                                              (9)
Return selectedConcepts
```

Figure 4:
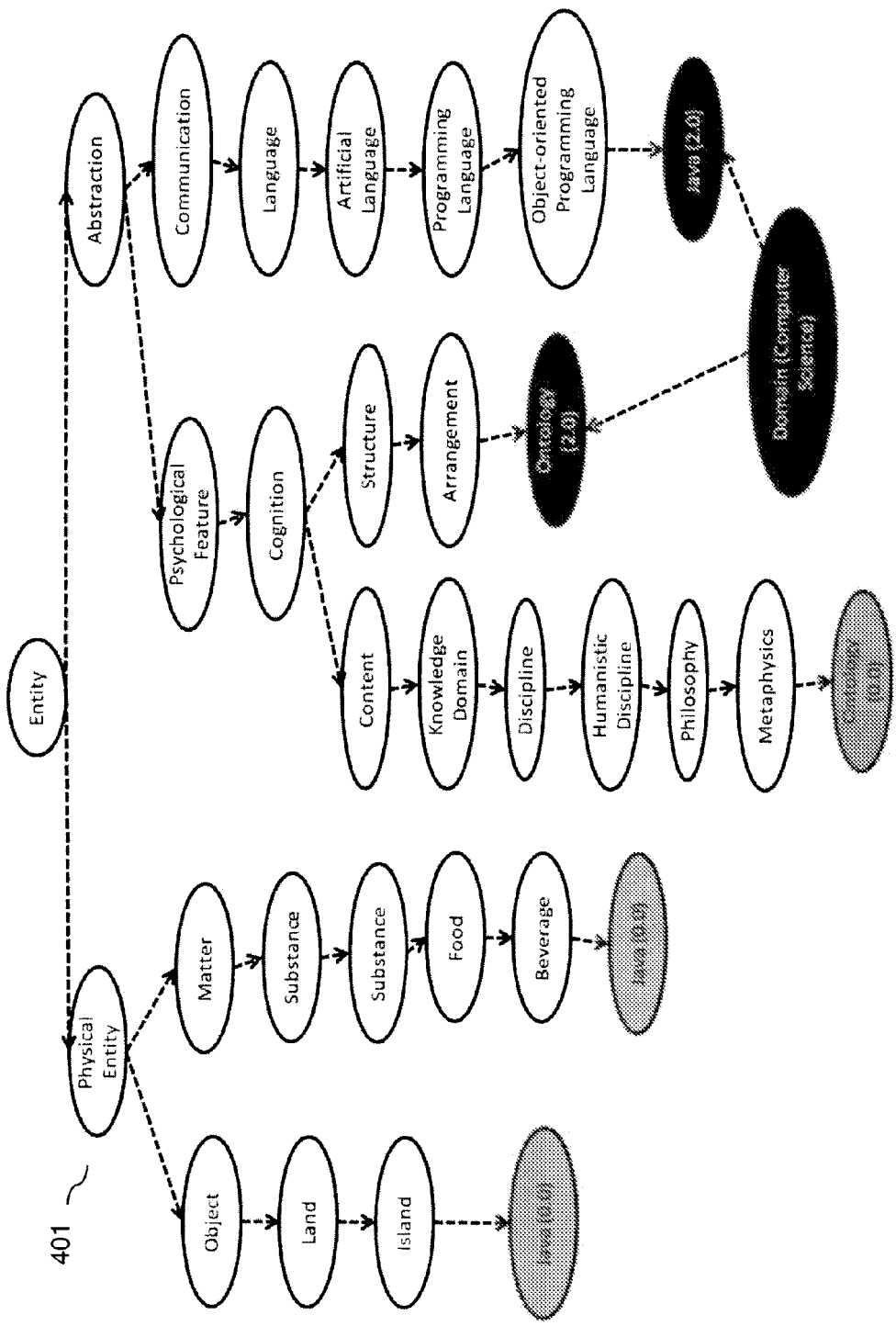
FIG. 4 is an exemplary domain based lexical chain.

FIG. 4 shows a domain based lexical chain 401 created by the domain mapping algorithm (9) (step 227) with Java and Ontology as noun input phrases. The meanings of Ontology are defined below. The domain mapping algorithm maps Java to its third and Ontology to its first meanings because the selected senses are defined under the computer science domain and other senses do not have a common domain relationship.

$$Ontology = \begin{cases} Ontology_n^1 \text{(organization of knowledge ...)} \\ Ontology_n^2 \text{(study of the nature of being ...)} \end{cases} \quad (10)$$

The holonym relation defines hasPart relationships between concepts. For example, the concept wheel is a holonymy (part of) of the concept car. In a holonym based lexical chaining approach, senses are connected with each other if there is a holonym relationship between them. Senses are also connected, if they have common holonym property. For example, both car and bus have part of wheel. Therefore, bus and car are connected to the same lexical chain. When forming chains, only the first degree holonym relationships are considered. For example, molecule has parts of atom and atom has parts of nucleus. The nucleus and molecule concepts would not be connected in a lexical chain because they do not have a direct holonym relationship. Senses in a lexical chain receive a WSD score representing the number of senses in the chain. The holonym algorithm maps a phrase to a sense, which receives a higher WSD score than the phrase's other senses (step 229).

The holonym mapping algorithm creates lexical chains using the holonym property of senses. In this algorithm, senses that have common holonym concepts are connected with each other. Senses may have multiple holonym concepts and may connect to multiple lexical chains. A sense receives a WSD score of a summation of a number of concepts in its connected chains. Then, the holonym algorithm maps a noun phrase to a sense that receives the highest WSD score among all senses of the noun phrase. The pseudocode of the holonym mapping algorithm is

```
P is a list of extracted noun phrases
selectedConcepts is an empty list
C is an empty list
H is an empty list
scores(c) is an empty hashtable that keeps scores of concepts where
  key c is a concept id length(i)returns length of a given list i
concepts(p)returns a list of concepts that correspond s to a given phrase p
holonym(c)returns a list of holonym concepts for a given concept c
for i = 0 to length(P)do
  C ← concepts(P_i)
    for j = 0 to length(C)do
      H ← holonym(C_j)
      for k = 0 to length(H)do
        scores(H_k) = scores(H_k) + 1
      end for
    end for
end for
// finding max scoredconcept
for i = 0 to length(P)do
  C ← concepts(P_i)
  S_max ← 0
    for j = 0 to length(C)do
      H ← holonym(C_j)
      for k = 0 to length(H)do
        scores(C_j) = scores(H_k) + scores(C_j)
      end for
      if scores(C_j) > S_max
        S_max ← scores(C_j)
        selectedConcepts_i ← C_j
      end if
    end for
end for                                                              (11)
Return selectedConcepts
```

Figure 5:
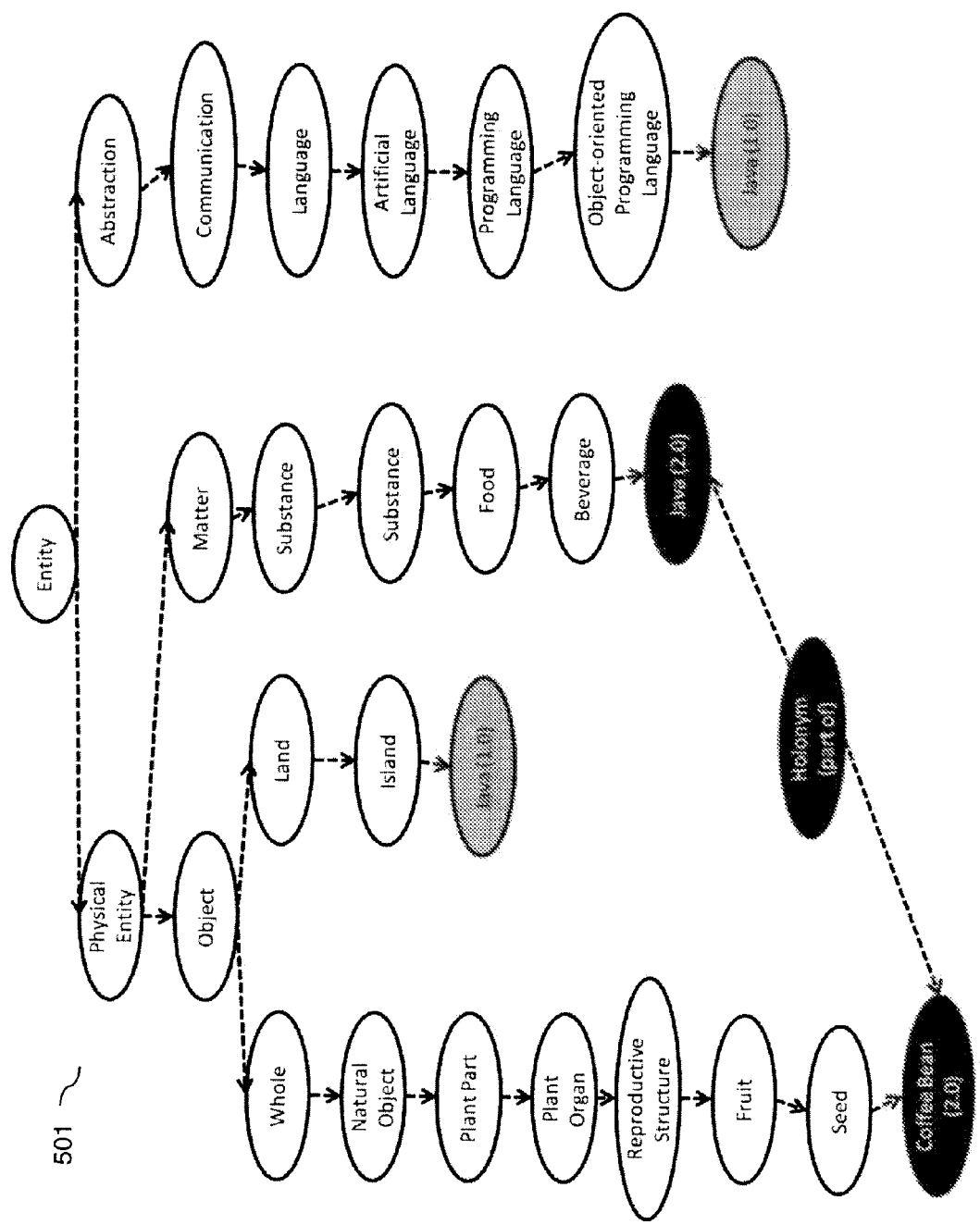
FIG. 5 is an exemplary holonym based lexical chain.

FIG. 5 shows a holonym based lexical chain 501 created by the holonym mapping algorithm (11) with Java and Coffee Bean as noun input phrases. The meanings of Coffee Bean are defined below. The holonym mapping algorithm maps Java to the second and Coffee Bean to the first meanings because of the part of relationship (holonym) between the two phrases. Other meanings do not have a common part of relationship.

$$Coffee\ Bean = \{Coffee\ Bean_n^1 \text{(a seed of the coffee ...)}\} \quad (12)$$

Most ontologies categorize their concepts. For example, every WordNet concept has a category. These are categories such as food, action, person, etc. Senses from the same category form a lexical chain, and they are scored as a number of senses in the chain. A category algorithm maps a phrase to a sense, which receives a higher WSD score than the phrase's other senses (step 231).

The category mapping algorithm creates lexical chains using the category property of senses. In this algorithm, senses within the same category are connected via a category node. They are not directly connected to each other. Given a set of noun phrases and their senses, they will form several lexical chains. Each chain has a category node and several sense nodes. Within a chain, the WSD score of each node including the domain node is equal to the size of the chain—how many nodes in the chain except the category node. Then, the category mapping algorithm maps a noun phrase to a sense that receives the highest WSD score among all senses of the noun phrase. The pseudocode of the category mapping algorithm is

```
P is a list of extracted noun phrases
selectedConcepts is an empty list
scores(c) is an empty hashtable that keeps scores of concepts where key c is a concept id
C is an empty list
length(i) returns length of a given list i
concepts(p) returns a list of concepts corresponds to a given phrase p
category(c) returns category property for a given concept c
for i = 0 to length(P) do
    C ← concepts(P_i)
    for j = 0 to length(C) do
        c ← category(C_j)
        scores(c) = scores(c) + 1
    end for
end for
// finding max scoredconcept
for i = 0 to length(P) do
    C ← concepts(P_i)
    S_max ← 0
    for j = 0 to length(C) do
        c ← category(C_j)
        if scores(c) > S_max
            max ← scores(c)
            selectedConcepts_i ← C_j
``` end if
end for
end for
Return selectedConcepts (13)

Figure 6:
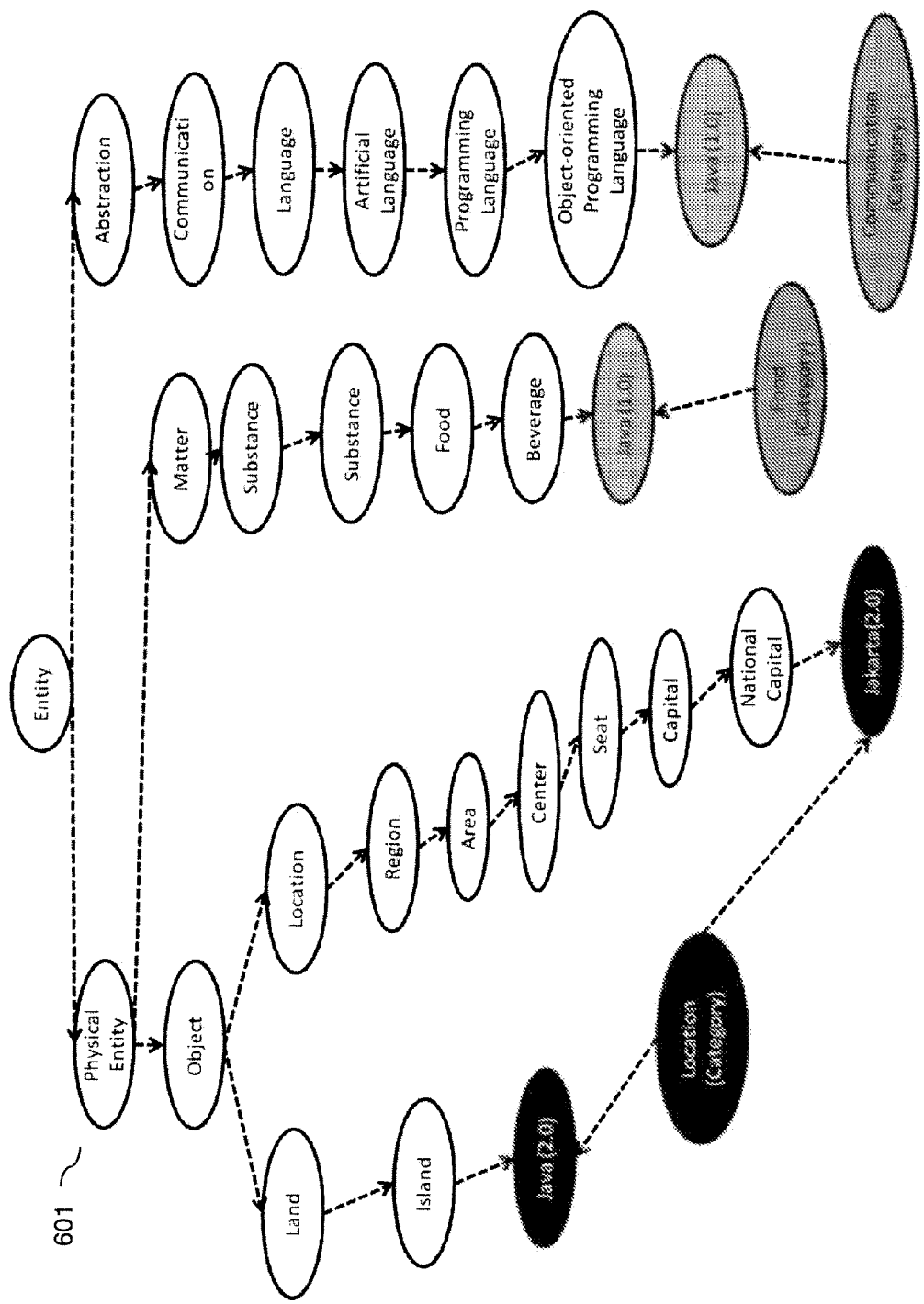
FIG. 6 is an exemplary category based lexical chain.

FIG. 6 shows a category based lexical chain 601 created by the category mapping algorithm (13) with Java and Jakarta as noun input phrases. The meaning of Jakarta as a concept is defined below. The category mapping algorithm maps Java and Jakarta to their first meanings. Because both of the senses are defined under the location category and other meanings do not have a common category relationship.

$$Jakarta = \{Jakarta_n^1 (capital\ and\ largest\ city\ of\ Indonesia)\} \quad (14)$$

Each of the above four lexical chaining algorithms has its advantages and disadvantages. Three additional algorithms: (1) Sense Rank, (2) SUM, and (3) SUM+ further improve the sense mapping result.

The Sense Rank algorithm maps noun phrases to the highest ranked sense from all of its meanings as defined in UNIpedia (step 233). Also, senses are scored using $$Rank(c) = \frac{1}{r_c}, \quad (15)$$

where the Rank(c) function is the rank score for a given concept c and $r_c$ is the sense rank of the concept in WordNet.

The SUM algorithm (16) is a weighted summation of normalized WSD scores from the hypernym (17), domain (18), holonym (19) and category (20) mapping algorithms (steps 235, 237). Weights (coefficients) are calculated based on the performance of each algorithm.

```
P is a list of extracted noun phrases
selectedConcepts is an empty list
C is an empty list
scores(c) is an empty hash table that keeps scores of concepts where key c is a concept id
length(i) returns length of a given list i
concepts(p) returns a list of concepts that corresponds to a given phrase p
getscore(l, c) returns score of concept c from a list l
Hypernymscores ← Hypernym(P)
Domainscores ← Domain(P)
Holonymscores ← Holonym(P)
Categoryscores ← Category(P)
for i = 0 to length(P) do
    C ← concepts(P_i)
    S_max ← 0
    for j = 0 to length(C) do
        scores(C_j) = W_hypernym * getscore(Hypernymscores, C_j) + W_domain * getscore(Domainscores, C_j) + W_holonym * getscore(Holonymscores, C_j) + W_category * getscore(Categoryscores, C_j)
        if scores(C_j) > S_max
            S_max ← scores(C_j)
            selectedConcepts_i ← C_j
        endif
    endfor
endfor
Returns selectedConcepts
```
(16)

```
function Hypernym (P)
C is an empty list
Threshold is a constant variable
selectedConcepts is an empty list
scores (c) is an empty hashtable keeps scores of concepts where key c is a concept id
phraseConceptScores is an empty hashtable keeps scores added by all concepts of a phrase where key is an combination of concept id c and a noun phrase p
length (i) returns length of a given list i
concepts (p) returns a list of concepts that corresponds to a given phrase p
parent (c,n) returns the nth parent for a given concept c
for i = 0 to length (P) do
```

```
C ← concepts (P_i)
    for j = 0 to length (C)do
        for k = 0 to Threshold do
            c ← parent (C_j,k)
            scores (c) ← scores (c) + (1 /(k + 1))
            phraseConc eptScores (c,P_i) ← phraseConc eptScore (c,P_i) + (1 /(k + 1))
        en d for
    end for
end for
// Secondphas estarts
for i = 0 to length (P)do
    C ← concepts (P_i)
    for j = 0 to length (C)do
        for k = 1 to Threshold do
            c ← parent (C_j,k)
            scores (C_j) ← scores (C_j) + scores (c) − phraseConc eptScores (c,P_i)
        end for
    end for
end for                                                                              (17)
Return scores
function Domain(P)
C is an empty list
H is an empty list
scores(c) is an empty hashtable that keeps scores of concepts where key c is a concept id
length(i)returns the element number of a given list i
concepts(p)returns a list of concepts correspond s to a given phrase p
domain(c)returns a list of domain concepts for a given concept c
for i = 0 to length(P)do
    C ← concepts(P_i)
    for j = 0 to length(C)do
        H ← domain(C_j)
        for k = 0 to length(H)do
            score(H_k) ← score(H_k) + 1
        end for
    end for
end for
for i = 0 to length(P)do
    C ← concepts(P_i)
    for j = 0 to length(C)do
        H ← domain(C_j)                                                              (18)
        for k = 0 to length(H)do
            scores(c) ← scores(c) + score(H_k)
        e nd for
    end for
end for
Return scores
function Holonym(P)
C is an empty list
H is an empty list
scores(c) is an empty hashtable that keeps scores of concepts where key c is a concept id
length(i)returns the element number of a given list i
concepts(p)returns a list of concepts correspond s to a given phrase p
holonym(c)returns a list of holonym concepts for a given concept c
for i = 0 to length(P)do
    C ← concepts(P_i)
    for j = 0 to length(C)do
        H ← holonym(C_j)
        for k = 0 to length(H)do
            scores(H_k) ← scores(H_k) + 1
        end for
    end for
end for
for i = 0 to length(P)do
    C ← concepts(P_i)
    for j = 0 to length(C)do
        H ← holonym(C_j)                                                             (19)
        for k = 0 to length(H)do
            scores(C_j) = scores(C_j) + scores(H_k)
        end for
    end for
end for
Return scores
function Category(P)
C is an empty list
c is an empty concept node
H is an empty list
scores(c) is an empty hashtable that keeps scores of concepts where key c is a concept id
length(i)returns the element number of a given list i
concepts(p)returns a list of concepts correspond s to a given phrase p
category(c)returns a list of category concepts for a given concept c
```

```
for i = 0 to length(P)do
    C ← concepts(P_i)
    for j = 0 to length(C)do
        c ← category(C_j)
            scores(c) ← scores(c) + 1
        en d for
    end for
end for
for i = 0 to length(P)do
    C ← concepts(P_i)
    for j = 0 to length(C)do
        c ← category(C_j)
        scores(C_j) ← scores(c)
    end for
end for
Return scores
```
(20)

In addition to ontological properties, the SUM+ algorithm takes statistical data of sense rank into consideration. As defined below, it is formulated as the summation of normalized WSD scores from the holonym, domain, hypernym and category mapping algorithms and the sense score from the Sense Rank algorithm with different weights (step 239). The pseudocode of the SUM+ algorithm is

```
P is a list of extracted noun phrases
selectedConcepts is an empty list
C is an empty list
scores(c)is an empty hashtable that keeps scores of concepts where
    key c is a conceptid
length(i)returns length of a given list i
concepts(p)returns a list of concepts that corresponds to a given phrase p
getscore(l,c)returns score of concept c from a given list l
rank(c)returns score using formula(15)
hypernymScores ← Hypernym(P)
domainScores ← Domain(P)
holonymScores ← Holonym(P)
categoryScores ← Category(P)
for i = 0 to length(P)do
    C ← concepts(P_i)
    S_max ← 0
    for j = 0 to length(C)do
        scores(C_j) =W_{hypernym} * getscore(hypernymScores,C_j) + W_{domain} *
            getscore(domainScores,C_j) + W_{holonym} *
            getscore(holonymScores,C_j) + W_{category} *
            getscore(categoryScores,C_j) + W_{rank} * rank(C_j)
        if scores(C_j) > S_max
            S_max ← scores(C_j)
            selectedConcepts_i ← C_j
        end if
    end for
end for
Return selectedConcepts
```
(21)

Evaluating and weight tuning uses SemCor as a training data set, compares the performance of different algorithms, and tunes their weights in the SUM (16) and SUM+ (21) algorithms (step 240). Then the sense mapping module returns the sense with the highest WSD score for noun phrases using the SUM+ algorithm.

SemCor is a widely used sense-tagged corpus in WSD research. Derived from the manual semantic annotation of the Brown corpus to WordNet senses, SemCor contains 352 documents tagged with approximately 234,000 sense annotations.

The SemCor metrics of Precision, Recall and F-measure are used to measure the performance of the mapping algorithms.

Precision evaluates the rate of correctness of given answers. For the sense mapping algorithm, Precision is calculated by $$\text{Precision} = \frac{\#\text{true sense mappings}}{\#\text{all sense mappings}}. \quad (22)$$

Recall is a measure of the coverage performance of a system. For the sense mapping algorithm, Recall is calculated by $$\text{Recall} = \frac{\#\text{true sense mappings}}{\#\text{all noun phases}}. \quad (23)$$

F-measure evaluates the overall performance of a system. F-measure is calculated by $$F-\text{measure} = \frac{2 \times \text{Precision} \times \text{Recall}}{\text{Precision} + \text{Recall}}. \quad (24)$$

FIG. 10 shows the Precision, Recall and F-measure of the hypernym, domain, holonym, category, Sense Rank, SUM and SUM+ algorithms based on the SemCor data set.

The category and domain mapping algorithms performed worse than the hypernym and holonym mapping algorithms, because categories are high level senses, which can not give enough information to disambiguate terms. Corresponding senses of a word can receive the same category value that decreases the recall of a chaining algorithm. The domain mapping algorithm suffers from low coverage (Recall). Only 8% of WordNet concepts have a defined domain relation. WordNet is limited in terms of domain and category relationships for disambiguating words in a context.

The hypernym mapping algorithm performed better than the other chaining algorithms in terms of Recall and F-measure, for the reason that hypernymy relations of senses are well defined in WordNet.

In this case, the Sense Rank algorithm performed better than the SUM+ algorithm because sense ranks are calculated based on a corpus and the test data is a sample from that corpus and only contains concepts defined in WordNet. For example, the sense Java island has the highest sense in WordNet. But when Java is searched using Google, the top web pages found are about the programming language Java. These sense ranks are not valid for web corpus. In addition, only concepts defined in WordNet have sense ranks. Most other ontology concepts do not have sense ranks.

In contrast, the SUM+ algorithm considers sense rank once it is available, otherwise the SUM+ algorithm finds the context of documents through other lexical chains.

Four different types of lexical chains are created separately in order to observe individual performances and decide which features to use in the WSD algorithm. The performance of the above algorithms gives clues about their coefficients in the SUM and SUM+ algorithms. Hypernym with the highest Recall and holonym with the highest Precision performed better than other algorithms in experiments. When the two lexical chains are combined, system performance increases to an F-measure value of 54.50% which is better than using hypernym or holonym alone. Since holonym has a very high Precision compared to others, better performance (54.77% F-measure) is observed when its weight is increased. On the other hand, the category and domain algorithms decreased the performance of the SUM and SUM+ algorithms.

When statistical feature sense ranks are used, performance increases significantly. It is because these sense ranks are calculated based on a corpus and the test data is a sample from that corpus and only contains concepts defined in WordNet.

The holonym mapping algorithm has the highest Precision value compared to the other three mapping algorithms. And it has the highest coefficient in the SUM and SUM+ algorithms. Different coefficient combinations are tried to maximize the performance of the SUM algorithm. Then, the SUM+ algorithm is evaluated using lexical chain coefficients that maximize the SUM algorithm with varying Sense Rank algorithm coefficients.

From (21), the hypernym, domain, holonym, category, and Sense Rank algorithms are specific cases of the SUM+ algorithm. The SUM+ algorithm can be applied with or without training data sets. With a training data set, a learning algorithm may be used such as multiple Kernel SVMs to learn the coefficients. With no training data set, the SUM+ algorithm can be used as a summarization of the hypernym and holonym algorithms as described above. Embodiments perform better than most mapping algorithms. Linear time O(n) lexical chaining algorithms are preferred for sense mapping for three reasons. First, it is desired to map concepts in real-time with a computation efficient approach, which has less computational complexity. Second, the lexical chaining approach gives information to rank and finds significant phrases. And third, it is desired to extract metadata without depending on any domain. Supervised systems require extensive annotated data that includes annotated data from all domains which is impracticable to acquire and process.

The concept weighting module 111 first weights semantic concepts by their Term Significance (TS) scores then returns key-phrases as semantic tags for the text input according to their TS scores.

Key-phrases (tags) can describe the content of a document, a web page, or a website. Key-phrases gain more popularity because they can be used to attract readers and improve search results. Since manually assigning key-phrases is expensive and time consuming, the majority of documents do not have associated key-phrases, thus automatic extraction techniques would be very useful for information retrieval and content management purpose.

Most existing key-phrase extraction algorithms only rely on statistical information which returns low performance. To improve performance, embodiments use semantic analyses to understand the context of content before key-phrases are extracted (step 241). Moreover, the key-phrases are semantic tags. These tags have formally defined senses and explicit semantic links to an ontology. Therefore, these key-phrases provide an efficient and meaningful representation of text to human users. Meanwhile, the key-phrases allow computers to understand and further exploit their semantics and semantic relationships for matching, comparing, and reasoning on textual data.

Embodiments implement a key-phrase extraction technique that computes TS scores of concepts using both ontological and statistical features. Specifically, TS scores are calculated with both semantic and statistical information (step 243, 245). Semantic information includes lexical chaining WSD scores derived from the WSD phrase, and Depth and Information Content (IC) values of a concept. Statistical information includes the Term Frequency (TF) and Inverse Google Popularity (IGP) values. The pseudocode for the weighting and combining scores algorithm is

---

P is a list of extracted noun phrases
selected Concepts is an empty list
C is an empty list
WSD_scores(c) is an empty hash table that keepsWSD scores of concepts where key c is a concept id
TS_scores(c) is an empty hash table that keeps TS scores of concepts where key c is a concept id length(i) returns length of a given list i
concepts(p) returns a list of concepts that corresponds to a given phrase p
getscore(l, c) returns score of concept c from a given list l
rank(c) returns score using formula(15)
depth(c) returns distance to the root concept for a given concept c
HypernymScores ← Hypernym(P)
DomainScores ← Domain(P)
HolonymScores ← Holonym(P)
CategoryScores ← Category(P)
for i = 0 to length(P) do
    C ← concepts($P_i$)
    max ← 0
    for j = 0 to length(C) do
        WSD_scores($C_j$) = $W_{hypernym}$ * getscore(hypernymScores, $C_j$) + $W_{domain}$ * getscore(domainScores, $C_j$) + $W_{holonym}$ * getscore(holonymScores, $C_j$) +
        $W_{category}$ * getscore(categoryScores, $C_j$) + $W_{rank}$ * rank(Cj)
        if WSD_scores($C_j$) > max
            max ← WSD_scores($C_j$)
            selectedConcepts$_i$ ← $C_j$
        endif
    endfor
endfor
for I = 0 to length(selectedConcepts) do
    C ← concepts(selectedConcepts$_i$)
    TS_scores(C) = $W2_{hypernym}$ * getscore(hypernymScores, $C_j$) + $W2_{domain}$ * getscore(domainScores, $C_j$) + $W2_{holonym}$ * getscore(holonymScores, $C_j$) +
    $W2_{depth}$ * depth(C) + $W2_{ic}$ * IC(C) + $W2_{tf}$ * TF(C) + $W2_{igp}$ * IGP(C)
endfor (25)

---

IC values of concepts are derived using the taxonomic structure of an ontology formed by hypernym relations. IC values measure how much information a concept expresses. Information Content is calculated by $$IC(c) = 1 - \frac{\log(Child(c)+1)}{\log(\max_{wn})}, \quad (26)$$

where the Child(c) function returns the number of concepts that have ancestor concept c. $\max_{wn}$ is a constant of the number of concepts that exist in an ontology. (26) returns values between a range of 0-1: leaf node concepts earn IC values of 1 while the root concept has an IC value of 0.

Google Popularity is a statistical value that represents the occurrence probability of a term in the collection of web pages indexed by the Google search engine (step 245). Google Popularity (GP) is $$GP(c) = \frac{\log f(c)}{\log M}, \text{ and} \qquad (27)$$

Inverse Google Popularity (IGP) is $$IGP(c) = 1/GP(c). \qquad (28)$$

Concept TS scores are computed by combining its semantic TS scores and statistical TS scores (step 247). As shown in (25), IGP, Depth and IC values of concepts are used to favor specific phrases, and TF statistical information is used to favor frequently used terms. The WSD scores derived from the category mapping algorithm are not used because category concepts are too general to give much information about term significance. Instead, category information is used to cluster key-phrases and filter tags of certain categories.

After TS score calculation, concepts are sorted by their TS scores in descending order and top concepts are extracted as key-phrases (step 249). Heuristics are applied to diversify the key-phrases distribution among different categories. For example, the TS score of a concept will be divided by two after the first occurrence of its category to increase category variety (step 251). Then the key-phrases are clustered by their categories. With categories such as people, event, location and time, the key-phrases can serve as recommended semantic tags of content to draw users' attention, improve content management and search (step 253).

Since the key-phrases are semantic phrases, some phrases can be mapped to the same sense. In such cases, all key-phrases are filtered except the no. 1 ranked key-phrase of that sense (step 255). Sometimes, terms that are too general to provide useful information are filtered. A concept is filtered if it has a lower frequency than all occurrences of its children concepts. For example, Honda, Toyota and BMW are children of the car concept. If all of the phrases appear in a document, the car phrase may be filtered if it has a lower frequency than its children concepts (step 257).

Figure 7:
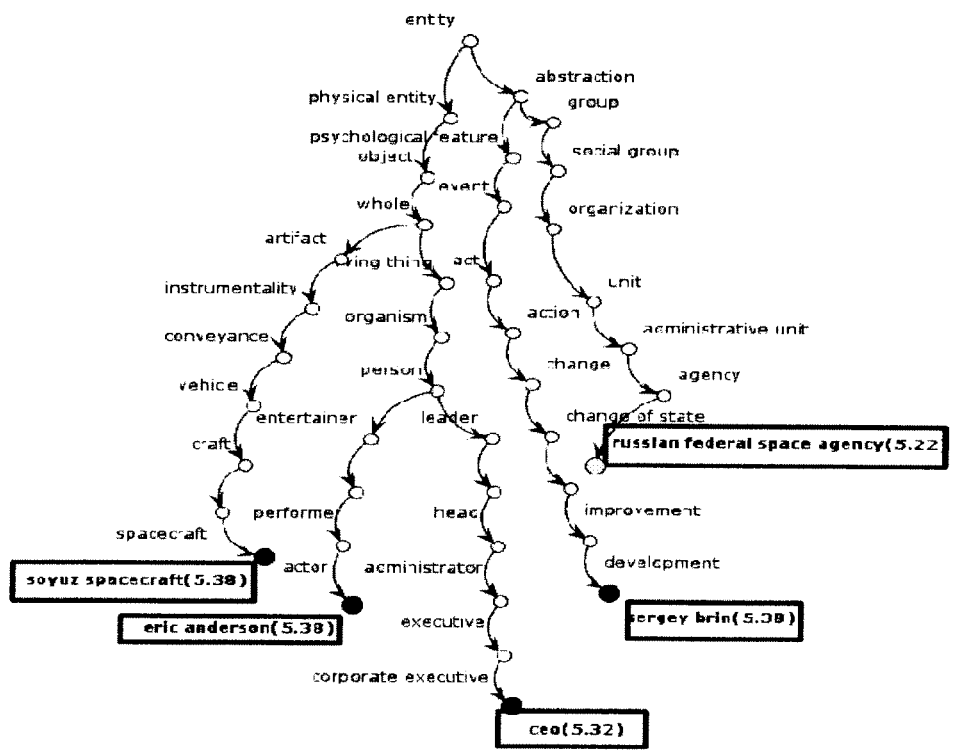
FIG. 7 is an exemplary text news article and an exemplary list of extracted key-phrases from the news article.

FIG. 7 is an exemplary news article extracted from CNN.com and shows author assigned key-phrases and key-phrases created from embodiments. In this example, the system framework 101 is set to return five key-phrases that are sorted in descending order according to their TS scores. The result shows key-phrases output that are matched to those of the author. Furthermore, it is clear that author assigned key-phrases do not adequately describe and summarize the content. In general, manual author tagging is subjective, time consuming, and may be poor in quality. It worsens if an author needs to provide more than ten tags. With different parameter settings, embodiments provide an automated semantic tagging approach to address this problem.

Figure 8:
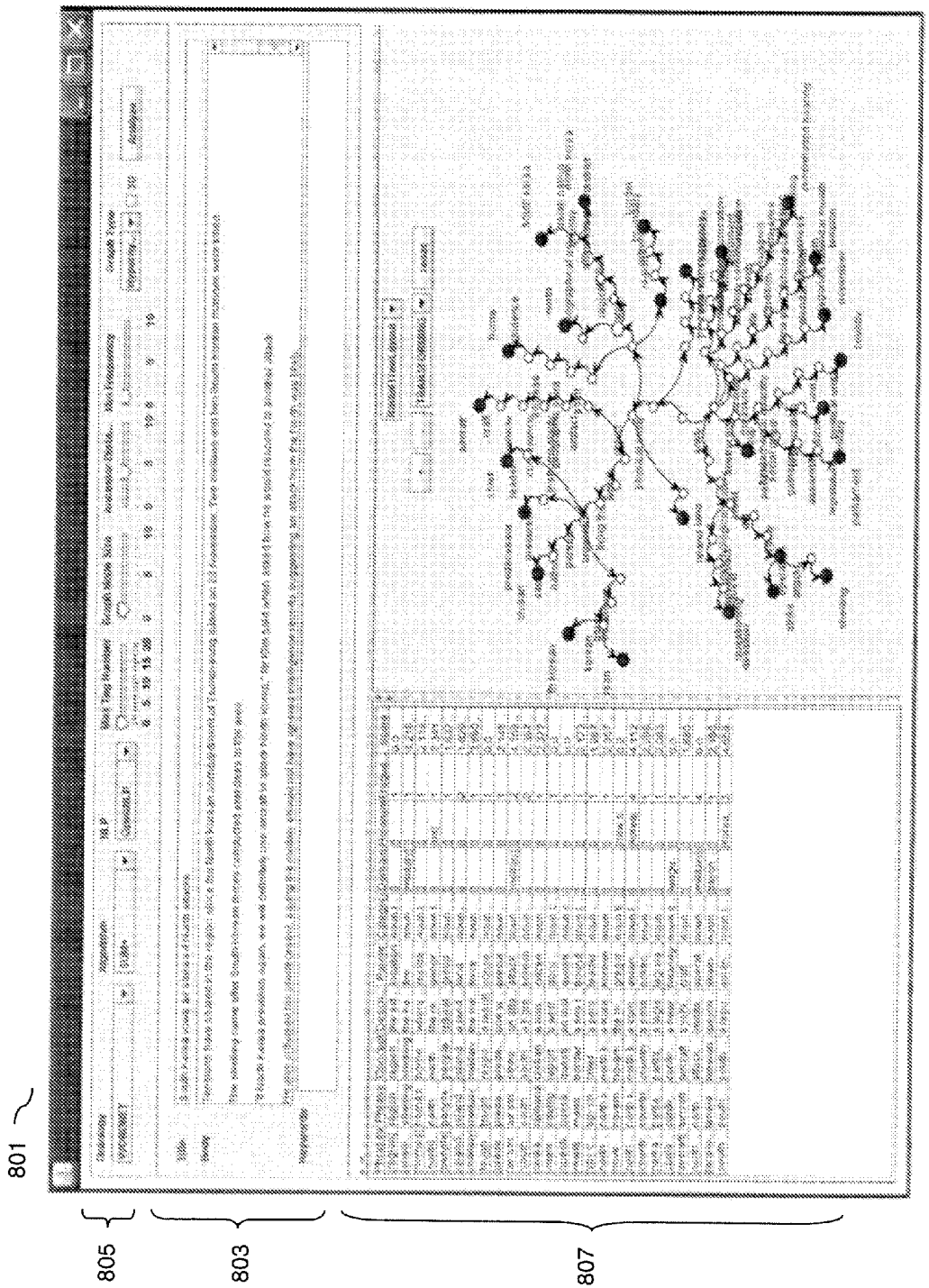
FIG. 8 is an exemplary user configuration tool screen view.

FIG. 8 shows a screen view of the Graphic User Interface (GUI) 105 used to run and test different algorithm and parameter settings. The GUI 105 allows users to input a document with title, body and keywords, and then allows the users to change system configuration and algorithm parameters to retrieve the semantic tags in table and graph views.

The GUI has three zones: A top configuration zone 805, a middle text input zone 803, and a bottom output zone 807.

The middle text input zone 803 comprises three text boxes: title, body and keywords. These three fields form the content input for semantic tagging. Title and keywords sections are not required. However, key-phrases from the title or the keywords sections have privileges over the text body. These phrases are not subject to the minimum occurrence limitation.

The top configuration zone 805 enables various parameter settings. To achieve better tagging results, different sense mapping algorithms may run with different parameter settings: different ontologies, mapping algorithms, NLP methods. The concept weighting algorithm can also be tuned by: key-phrase number, maximum ancestor distance, minimum occurrence frequency, node size, graph layouts and graph dimension.

In the top configuration zone 805, the parameters are (from left to right): Ontology, Algorithm, NLP, Max. Tag Number, Graph Node Size, Ancestor Distance, Min. Frequency, Graph Type and Dimension.

Ontology: Embodiments support one or more ontologies such as WordNet and UNIpedia, and are extendable with new ontologies. The ontologies may be converted into a knowledge representation model using Lucene index files.

Algorithm: It determines which algorithm(s) is used during the sense mapping phase. As described above, seven algorithms are implemented: category mapping, hypernym mapping, holonym mapping, domain mapping, SENSE RANK, SUM and SUM+.

NLP: OpenNLP or Minipar APIs can be selected to extract noun phrases from input text.

Max. Tag Number: The key-phrase number specifies the maximum number of extracted semantic tags from the input text.

Graph Node Size: For each tag node in the output semantic tag graph, node size represents the significance of the tag. This parameter specifies the maximum node size for graph display purposes.

Ancestor Distance: It determines the maximum ancestor distance between two senses to form a chain between them.

Min. Frequency: It is used to filter key-phrases that have been encountered below the specified value in the input text. This is not applied to key-phrases in the Title and Keywords sections. Minimum frequency occurrence may be calculated automatically using $$\text{Min}F = \frac{PhraseNum \times \log 10(PhraseNum)}{UniquePhraseNum} - 1, \qquad (29)$$

where the MinF function returns the minimum occurrence frequency for a given text document. PhraseNum is the number of extracted nouns and UniquePhraseNum is the number of extracted unique nouns.

Graph Type: It specifies what ontological property is chosen as the link type of the generated semantic tags graph: Hypernym or Domain.

Dimension: The semantic tag cloud may be visualized in either two or three dimensions.

The output zone 807 shows a table of semantic tags and a graph of semantic tags. The table contains detailed information about semantic tags such as definition, parent concept, frequency, score, etc. The table may be sorted according to each defined field. The graph visualizes the semantic tags as nodes and relationships between tags as graph linkages. Semantic tags derived from UNIpedia are colored in the graph. Other property nodes are colored white. As shown in FIG. 8, dark leaf nodes are tags derived from the input text. Node size represents the frequency of concept occurrence. Graph type specifies the source of the graph which can be hypernym or domain properties of concepts in the ontology.

Different graph layouts can be chosen to visualize the semantic tags (step 259). These layouts include Radial Tree, Balloon, Inverted Self-Organizing Maps (ISOM), Kamada-Kawai (KK), Fruchterman-Reingold (FR), Circle and Spring.

One of the advantages of knowledge based WSD algorithms is that why a sense is selected in a context is visible unlike other supervised or unsupervised WSD algorithms. Once a user enters a text input, selects parameters, and clicks the "Analyze" button, the results are displayed in the output zone 807. The left part of the display shows the retrieved semantic tags along with their detailed information, by which users can further study the result and improve the algorithms. The right part of the display shows the semantic tag graph, which serves as a semantic tag cloud for the user after simplification, or can be saved as the semantic tag print of the text content input for semantic content retrieval, search, comparison, and data integration purposes.

Embodiments perform automated semantic tagging that maps text content to semantic tags. A set of tagging algorithms and a GUI are created for visualization and debugging. With automatically generated semantic tags, content from a heterogeneous source can be easily integrated at a semantic level. Moreover, the tags facilitate semantic content management and search applications with more accurate and meaningful search results and intuitive GUI and navigation.

One or more embodiments of the present invention have been described. Nevertheless, it will be understood that various modifications may be made without departing from the spirit and scope of the invention. Accordingly, other embodiments are within the scope of the following claims.

What is claimed is:

1. A semantic tagging method that outputs semantically linked tags for text content comprising:
   inputting the text content to a computer;
   by the computer, extracting nouns and noun phrases from the text content;
   by the computer, mapping the extracted nouns and noun phrases to terms of an ontology;
   by the computer, mapping the extracted nouns and noun phrases to a correct sense of the ontology terms using lexical chaining Word Sense Disambiguation (WSD) algorithms;
   by the computer, weighting the extracted nouns' and noun phrases' concepts from their ontological and statistical features;
   by the computer, extracting key-phrases from the weighted concepts; and
   by the computer, outputting the key-phrases as semantic tags;
   wherein mapping the extracted nouns and noun phrases to terms of an ontology further comprises:
      accessing the ontology;
      comparing the nouns and noun phrases with the ontology terms; and
      if there is an exact match, retrieving the ontology term, and if there is not an exact match, performing phrase mapping using a rule based algorithm; and
   wherein the phrase mapping rule based algorithm further comprises:
      generating two sub phrases by removing the first and last word from the noun phrases and replacing the original noun phrases with the two sub phrases; and
      repeating the phrase mapping until there is a match or there are no more noun phrases remaining.

2. The method according to claim 1 wherein the ontology is UNIpedia.

3. The method according to claim 1 wherein the ontology is a domain-specific ontology.

4. The method according to claim 1 wherein extracting nouns and noun phrases from the text content further comprises using a Natural Language Processing (NLP) Application Programming Interface (API).

5. The method according to claim 4 wherein extracting nouns and noun phrases from the text content further comprises:
   detecting sentences from the text content;
   detecting tokens from the detected sentences;
   labeling the tokens; and
   extracting consecutive noun tokens and noting their frequency of use.

6. The method according to claim 5 further comprising preprocessing the text content by removing all characters other than alphabetical characters and grammatical punctuation marks.

7. The method according to claim 6 further comprising removing numerical expressions.

8. The method according to claim 5 wherein detecting sentences further comprises splitting the text content into sentences.

9. The method according to claim 5 wherein detecting tokens from the sentences further comprises:
   splitting the sentences into tokens; and
   splitting the tokens that are contractions.

10. The method according to claim 5 wherein labeling the tokens further comprises labeling the tokens as part-of-speech.

11. The method according to claim 5 wherein extracting consecutive noun tokens further comprises parsing noun phrases.

12. The method according to claim 1 wherein weighting of the extracted nouns' and noun phrases' concepts further comprises:
   computing semantic Term Significance (TS) scores using lexical chaining WSD scores derived from previous phrase, Depth and Information Content (IC) values;
   computing statistical TS scores using Term Frequency (TF) and Inverse Google Popularity (IGP);
   computing concept TS scores by summing the semantic and statistical scores;
   sorting concepts by their concept TS scores in descending order and extracting top key phrases;
   diversifying key phrase distribution over different categories using heuristics; and
   clustering key phrases according to categories to describe the text content.

13. The method according to claim 1 wherein extracting key phrases from the weighted concepts further comprises:
   filtering all key phrases except the top ranked key phrase of a sense; and
   filtering a key phrase that has a lower frequency than all occurrences of its children concepts.

14. A semantic tagging method that outputs semantically linked tags for text content comprising:
   inputting the text content to a computer;
   by the computer, extracting nouns and noun phrases from the text content;
   by the computer, mapping the extracted nouns and noun phrases to terms of an ontology;
   by the computer, mapping the extracted nouns and noun phrases to a correct sense of the ontology terms using lexical chaining Word Sense Disambiguation (WSD) algorithms;

by the computer, weighting the extracted nouns' and noun phrases' concepts from their ontological and statistical features;

by the computer, extracting key-phrases from the weighted concepts; and by the computer, outputting the key-phrases as semantic tags;

wherein mapping the extracted nouns and noun phrases to a correct sense of the ontology terms further comprises:

creating a hypernym lexical chain with WSD scores for senses of the input nouns and noun phrases;

creating a domain lexical chain with WSD scores for senses of the input nouns and noun phrases;

creating a holonym lexical chain with WSD scores for senses of the input nouns and noun phrases;

creating a category lexical chain with WSD scores for senses of the input nouns and noun phrases;

normalizing the WSD scores in each of the hypernym, domain, category and holonym lexical chains;

generating a WSD score using a sense rank algorithm;

assigning weights to each WSD score and summing the weighted WSD scores for the hypernym, domain, category, holonym lexical chains, and the sense rank algorithm;

evaluating the hypernym, domain, category and holonym lexical chains, the sense rank algorithm and optimizing their weights for a given target data; and mapping the nouns and noun phrases to a highest ranked sense.

15. The method according to claim 14 wherein creating a hypernym lexical chain further comprises receiving a set of nouns and noun phrases and corresponding senses from the ontology and creating a lexical chain.

16. The method according to claim 15 wherein creating a hypernym lexical chain further comprises:

initializing each nouns' and noun phrases' senses WSD score to zero;

connecting one sense to another sense having a common ancestor; and increasing the WSD scores of a sense's ancestor until reaching a predetermined threshold of ancestor distance, wherein a sense that has a higher number of connected senses in the lexical chain receives a higher WSD score, and these senses form a noun and noun phrase context.

17. The method according to claim 16 wherein creating a hypernym lexical chain further comprises:

incrementing a sense score by adding the WSD scores of their ancestor senses; and selecting extracted nouns and noun phrases based on senses that receive the highest WSD scores among the nouns' and noun phrases' senses.

18. The method according to claim 17 wherein creating a hypernym lexical chain for senses derived from the same nouns and noun phrases that have different parent senses and these parent senses may have common ancestor further comprises:

subtracting scores added by a sense itself and senses that have common sense names; and adding an extra score for a sense based on the number of its synonyms.

19. The method according to claim 14 wherein creating a domain lexical chain further comprises:

connecting senses defined in a same domain via a domain concept node to form a domain lexical chain;

scoring each sense according to the number of concepts within the domain lexical chain;

if a sense itself is a domain concept, its WSD score is equal to the number of concepts within its lexical chain; and mapping a noun or noun phrase to a sense that receives the highest WSD score among all senses of the noun or noun phrase.

20. The method according to claim 14 wherein creating a holonym lexical chain further comprises:

connecting two senses with each other if there is a holonym relationship between them or if they have a common holonym property;

considering only the first degree holonym relationships when connecting senses to create a holonym lexical chain;

scoring each sense based on the number of concepts in its connected holonym lexical chains; and mapping a noun and noun phrase to a sense that receives a higher WSD score than the noun's and noun phrase's other senses.

21. The method according to claim 14 wherein creating a category lexical chain further comprise:

connecting senses defined in a same category via a category concept node to create a category lexical chain;

scoring a sense according to the number of concepts within the category lexical chain; and mapping a noun and noun phrase to a sense that receives the highest WSD score among all senses of the noun and noun phrase.

22. The method according to claim 14 wherein summing the weighted WSD scores for the hypernym, domain, category, holonym lexical chains, and the sense rank algorithm further comprises:

calculating weights based on the performance of the hypernym lexical chain, domain lexical chain, holonym lexical chain, category lexical chain, and the sense rank algorithm; and summing weighted WSD scores from the hypernym lexical chain, domain lexical chain, holonym lexical chain, category lexical chain, and the sense rank algorithm.

23. The method according to claim 14 wherein evaluating the hypernym, domain, category, holonym lexical chains, and the sense rank algorithm and optimizing their weights for a given target data further comprises:

selecting a subset from the target data source as a training data set;

performing the hypernym lexical chain, domain lexical chain, holonym lexical chain and category lexical chain algorithms;

calculating the hypernym lexical chain, domain lexical chain, holonym lexical chain, category lexical chain Precision, Recall, and F measure;

including WSD scores from the sense rank algorithm;

calculating the sense rank algorithm Precision, Recall, and F measure; and calculating weights of scores from the hypernym lexical chain, domain lexical chain, holonym lexical chain, category lexical chain and sense rank algorithms based on the performance of the hypernym lexical chain, domain lexical chain, holonym lexical chain and category lexical chain and sense rank.

* * * * *